United States Patent [19]

Ananth et al.

[11] Patent Number: 5,327,311

[45] Date of Patent: * Jul. 5, 1994

[54] TECHIQUE FOR PROVIDING BACK BAR AND BOSS FOR SLIDER

[75] Inventors: Raju S. Ananth, San Jose; Michael A. Verdone, Hillsborough, both of Calif.

[73] Assignee: Unisys Corporation, Blue Bell, Pa.

[*] Notice: The portion of the term of this patent subsequent to Nov. 19, 2008 has been disclaimed.

[21] Appl. No.: 6,422

[22] Filed: Jan. 19, 1993

Related U.S. Application Data

[62] Division of Ser. No. 896,717, Jun. 10, 1992, Pat. No. 5,220,470, which is a division of Ser. No. 225,680, Jul. 29, 1988, abandoned, which is a division of Ser. No. 836,364, Mar. 5, 1986, abandoned.

[51] Int. Cl.$^5$ .......................... G11B 5/60; G11B 17/32
[52] U.S. Cl. .................................. 360/103; 360/102
[58] Field of Search .......................... 360/103, 102

[56] References Cited

U.S. PATENT DOCUMENTS

| 5,067,037 | 11/1991 | Ananth et al. | 360/103 |
| 5,220,470 | 6/1993 | Ananth et al. | 360/103 |

FOREIGN PATENT DOCUMENTS

| 0213388 | 3/1987 | European Pat. Off. | 360/103 |
| 58-128052 | 7/1983 | Japan | 360/103 |

Primary Examiner—John H. Wolff
Attorney, Agent, or Firm—John J. McCormack; Mark T. Starr

[57] ABSTRACT

Salient embodiments comprise magnetic recording sliders whose record-confronting face is characterized by two or three rails wherein stiction forces are counteracted by provision of a "boss" on one or several rails, or therebetween; and also characterized by provision of a "back-bar" and associated a purge channel; and methods for rendering such are also described.

67 Claims, 26 Drawing Sheets

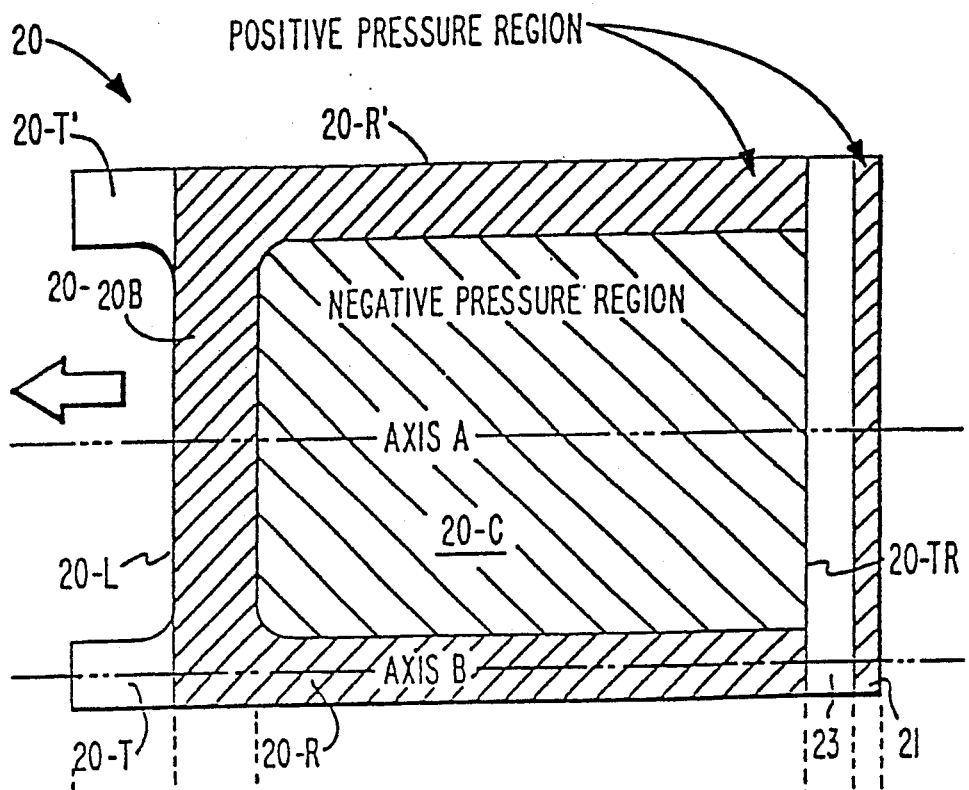
FIG.5.
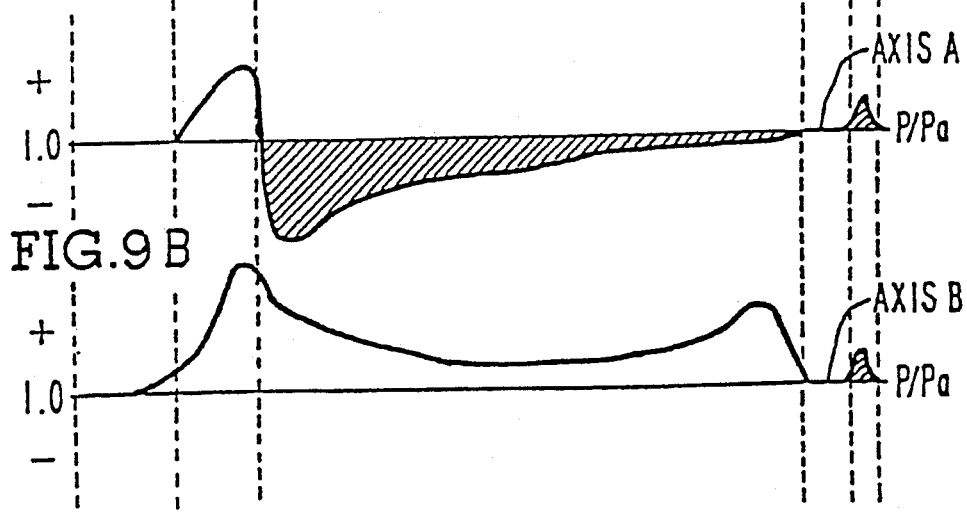
FIG.9 A
FIG.9 B

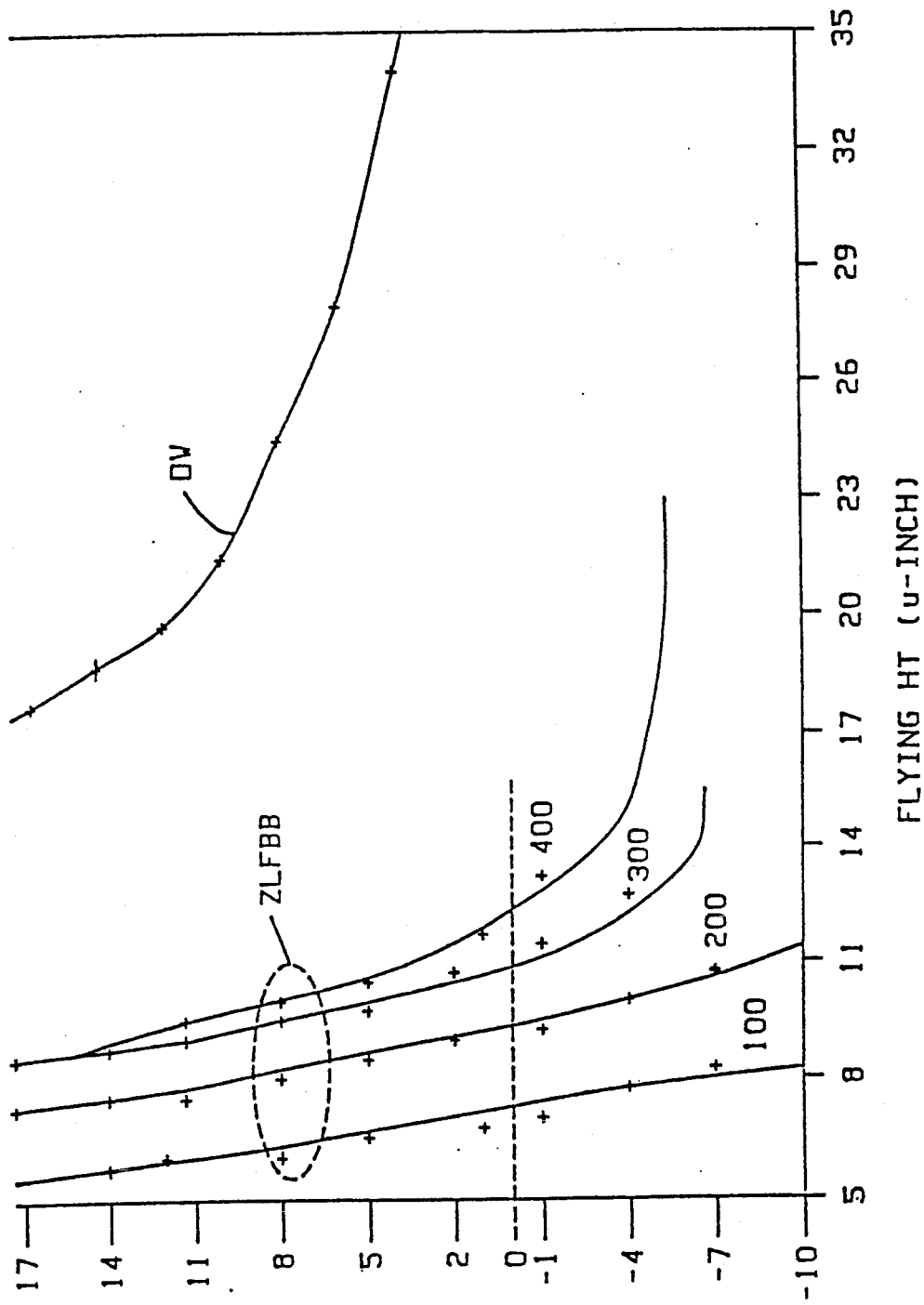

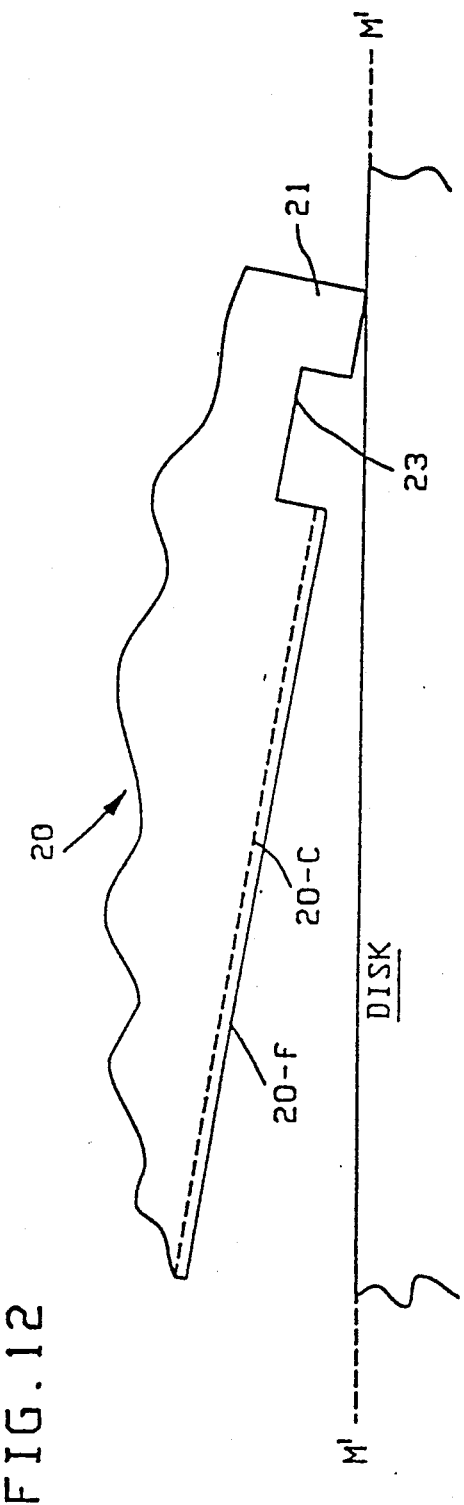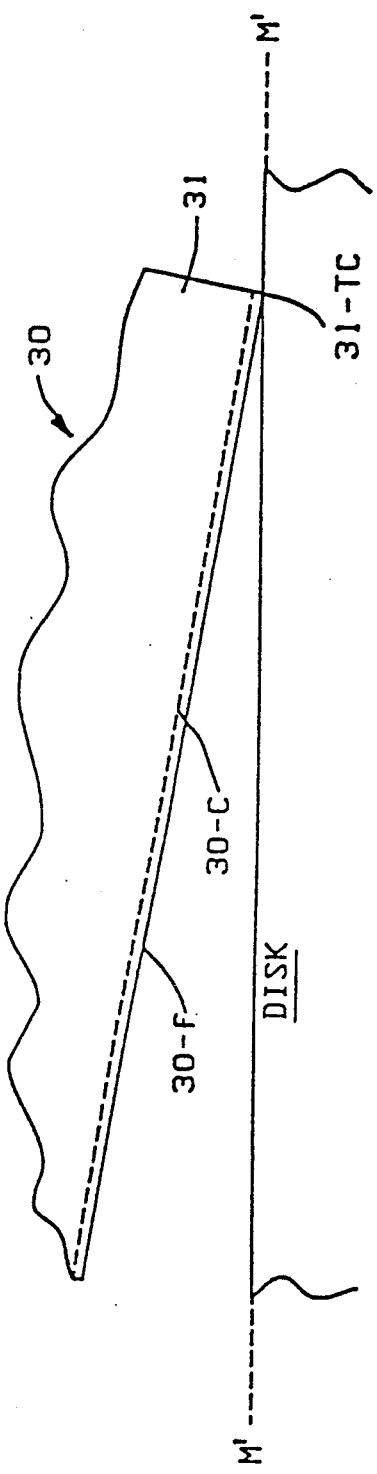

∗ — AIR BEARING SURFACE (ABS)

FIG. 5.′
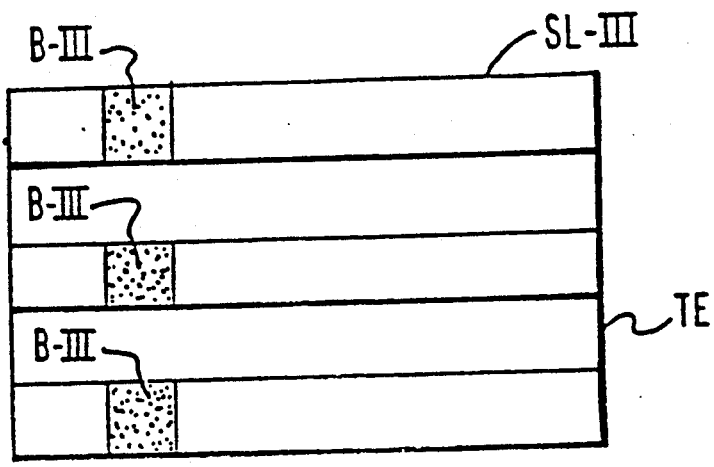
FIG. 6.′
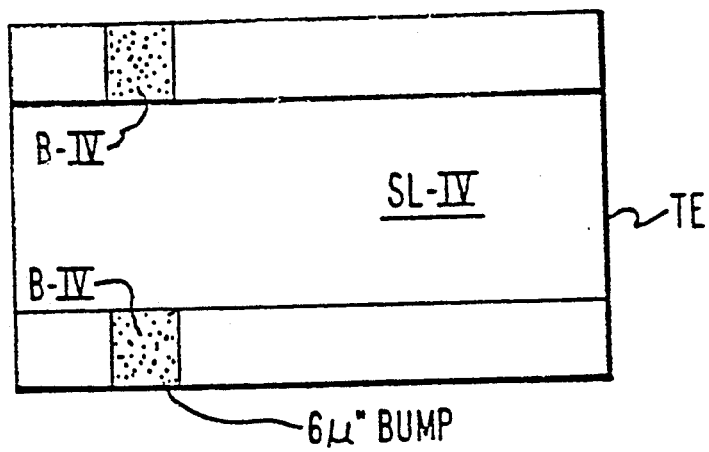
FIG. 7.′
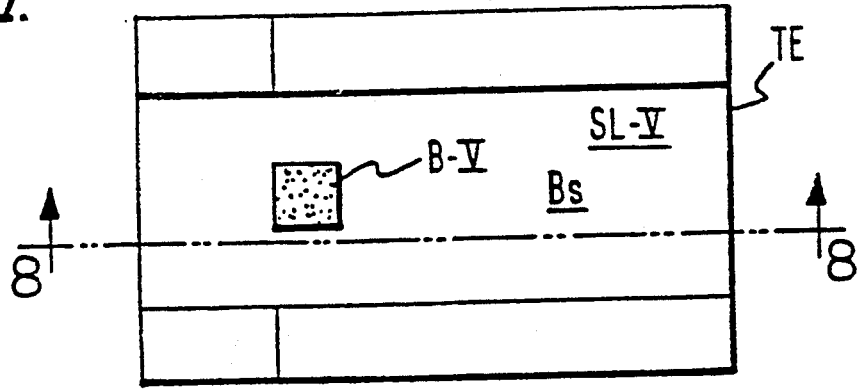
FIG. 8.′
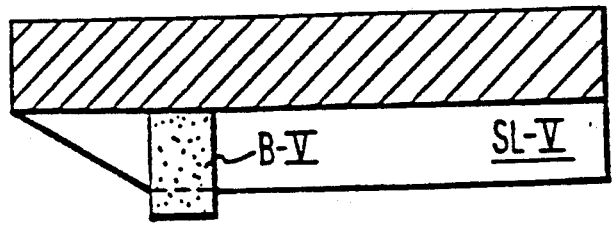

∗ — AIR BEARING SURFACE (ABS)

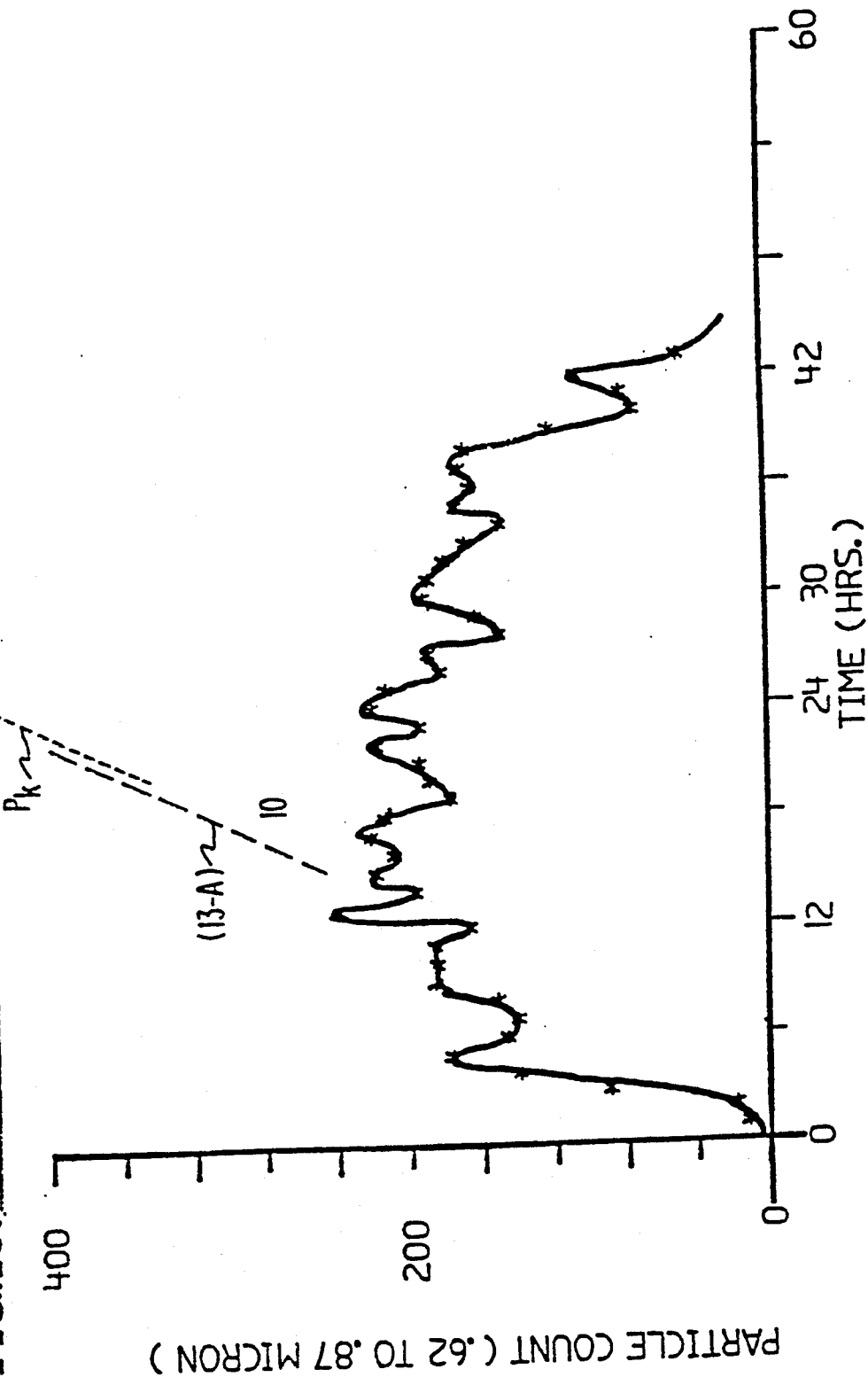

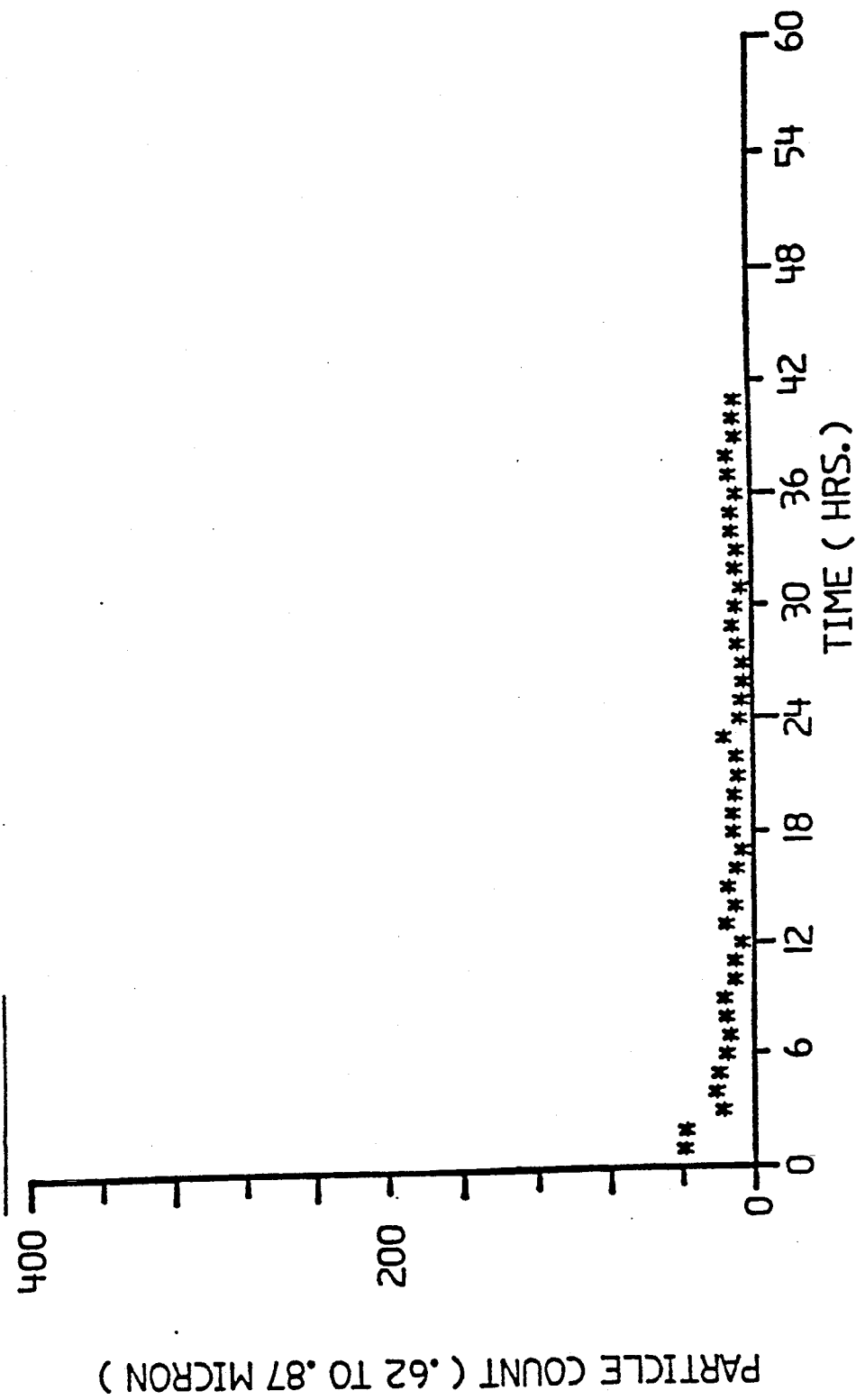
FIG. 14. WEAR TEST MRX NO STICK SLIDER. MRX SLIDER. (SEE FIG. 1A.)

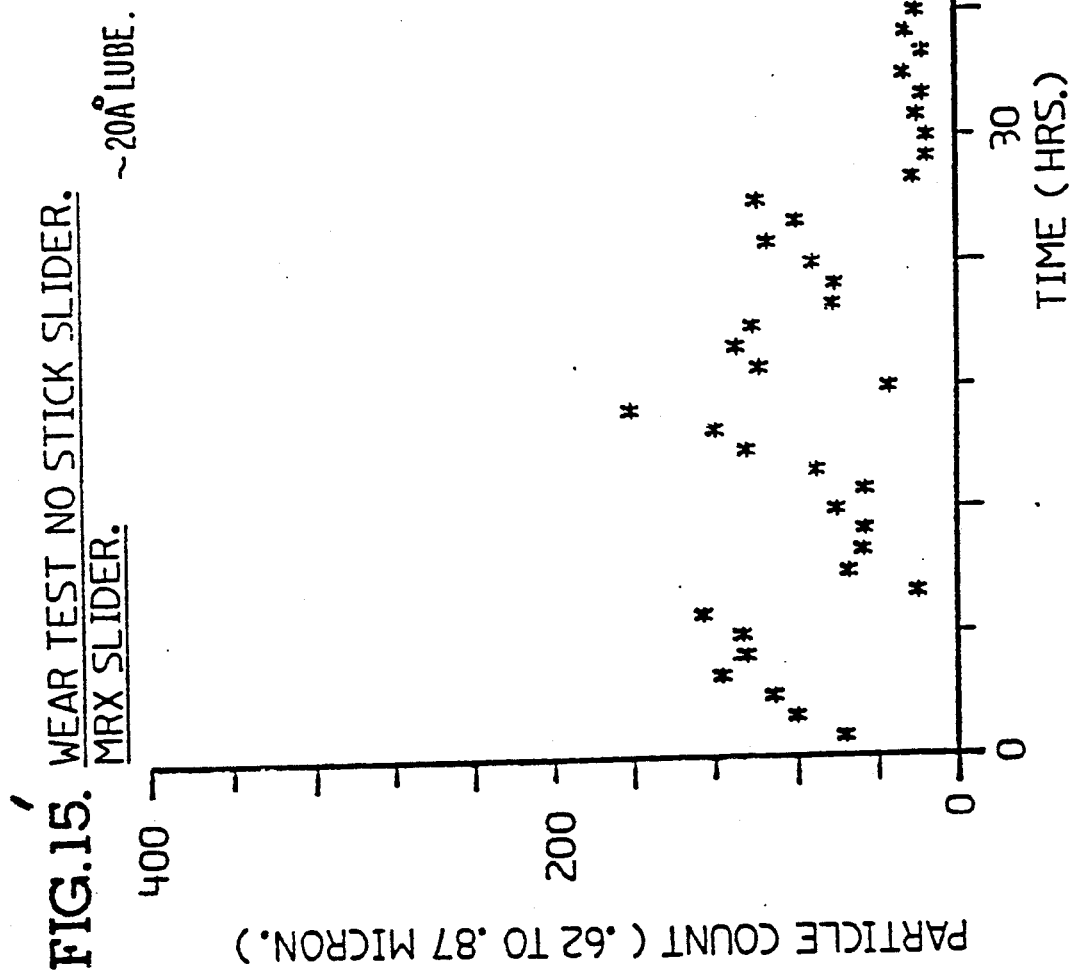

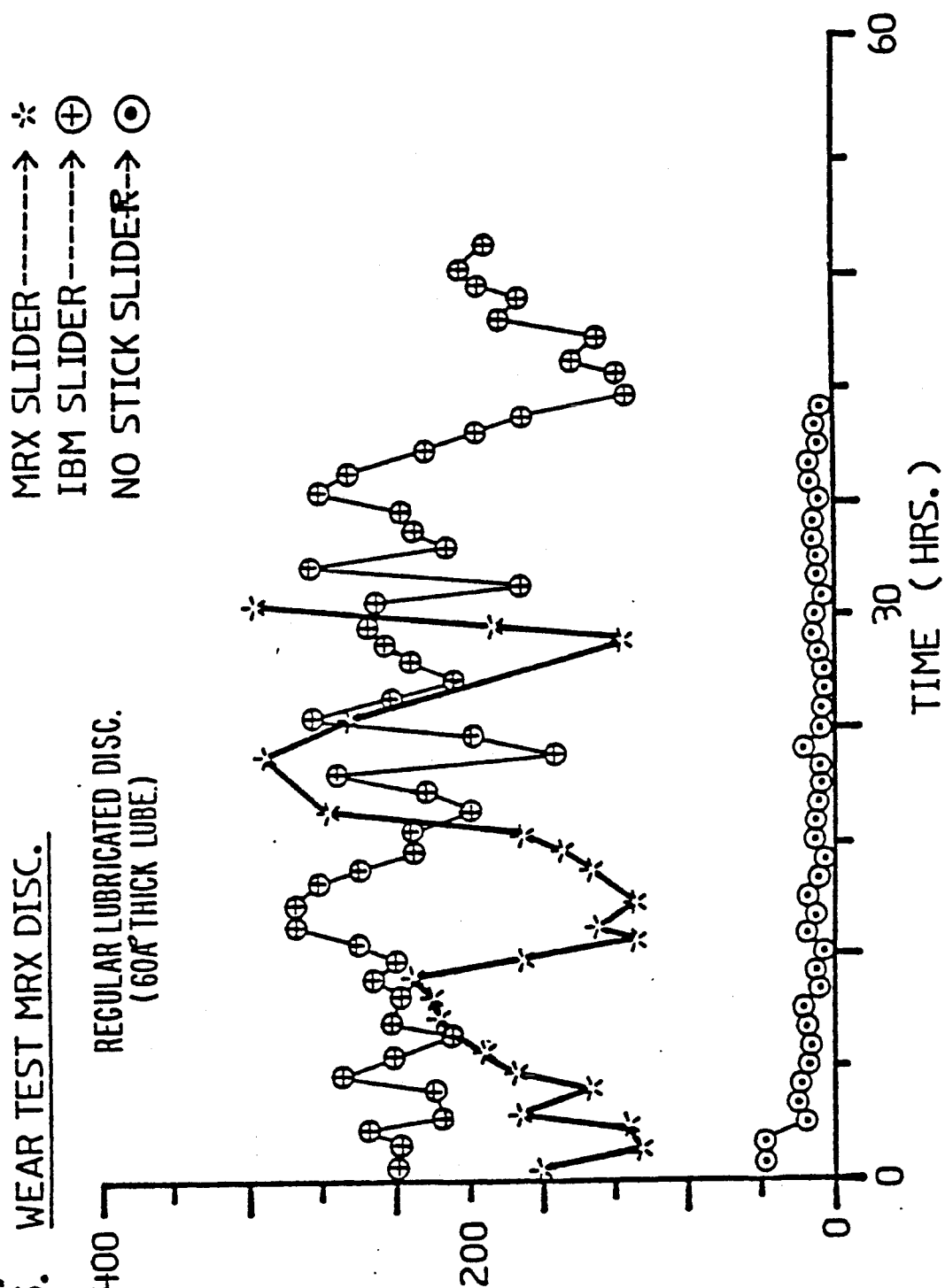

TECHIQUE FOR PROVIDING BACK BAR AND BOSS FOR SLIDER

This is a division of application Ser. No. 07/896,717 filed Jun. 10, 1992, now U.S. Pat. No. 5,220,470, issued Jun. 15, 1993, which is a division of U.S. Ser. No. 225,680, filed Jul. 29, 1988, now abandoned, which is a division of Ser. No. 836,364, filed Mar. 5, 1986, now abandoned.

FIELD OF THE INVENTION

The present invention relates to magnetic head-slider assemblies, and more particularly to air bearing slider assemblies used for noncontact recording in magnetic disc files and the like.

PRIOR ART, INVENTION FEATURES

Workers are aware of prior art techniques to utilize magnetic head-slider assemblies. In such an air bearing slider assembly, magnetic transducers are affixed thereto for non-contact recording on a passing magnetic disc. Workers know how to mount such magnetic head assemblies (having air bearing sliders) onto carriages—e.g., to be used in integrated data modules for storage of information in a magnetic disc file.

Tremendous efforts are being made now to increase the density of storage on such magnetic discs—e.g., workers are trying to narrow disc-track width, reducing the spacing between each track to increase the number of tracks per inch. Likewise, workers are trying to develop head assemblies which are capable of recording and reproducing information using minimal disc area.

For instance, to improve recording density in disc drives- used as computer peripherals, it is believed vital to increase linear recording density as well as the track density (so many more tracks per inch may be recorded on a disc). It is also necessary to so record information as to be retrieved reliably, and as rapidly as possible, and to reduce the cost per byte. Thin film head technology is now successfully used to fabricate recording transducer elements. And, it is now accepted that a number of transducers, accurately spaced, can be laid down on a single slider body at little or no cost sacrifice.

Other workers have suggested placing one or more transducers at the "trailing edge" of the air bearing (rail). But this can be costly—e.g., for the manual labor to install wirewound transducers "in line" with an air bearing surface.

This invention provides an improvement over conventional "low-mass" sliders .(i.e., "Winchester" or "self-load" types) , in the addition of a "full back bar" on the slider. This "back bar", when added to a "self-load" slider (e.g., see FIGS. 5–8), does not upset performance, yet can allow one to increase the number of slider-heads independent of the number of rails. The "back bar" is characterized by an air-passage-slot (i.e., "purge channel") cut perpendicular to the air bearing surface and parallel to the "back bar". Such a "back bar" can provide a "positive pressure distribution" able to reduce the "pitch-restoring moment"; thus, it can reduce "pitch angle". Such a back-bar is easy to fabricate, "and can provide a "cleaner" slider surface that is closest to the disc (magnetic media).

And a like back-bar/purge channel combination can provide similar enhancement for a Winchester type slider (e.g., see FIGS. 1-4 for a more conventional Winchester; also see U.S. Pat. No. 4,081,846 and art cited therein).

"Comparison Model" (FIGS. 1–4)

FIGS. 1–4 schematically depict a "modified Winchester" type slider assembly wherein "flying height" will be understood as controlled by means of a differential fluid release bypass aperture, and/or by varying other parameters, such as the rail width. This model is intended for comparison with the preferred embodiments (e.g., having mere relief slots P, R rather than a "back bar" and "purge-channel").

Workers will recognize such a magnetic head-slider assembly 10 as like those commonly used for flying a magnetic head on an air-bearing over a disc or like information-storing medium (see plane M—M of medium passage). Slider assembly 10 has a support body 11 (ceramic) with a top surface (shown generally as a) and an opposed air-bearing surface, shown generally as b. Surface b is to be "flown" above the disc surface (as shown diagrammatically by arrow) and in a predetermined direction. The support body 11 has a leading edge c and a trailing edge d (taken relative to travel of the media, as depicted by arrow). The fluid bearing surface b has a pair of parallel, planar fluid support rails f, g extending in a direction opposite to the predetermined direction of movement (shown by arrow). Each end of the support rails has a leading edge which is canted slightly, away from the media plane M—M, to form a slight angle between the edge of each fluid support rail and the plane defined thereby.

Workers will appreciate that a flat fluid support surface h extends transverse to the predetermined medium plane M—M; surface h will be understood as extending between, and substantially planar to, air bearing rails f and g, to define a trailing edge d relative to the leading edge c.

Also, there is a ramp. surface k extending from the flat air-bearing (fluid support) surface b, and between the spaced rails f, g. Ramp surface k is set at a preselected angle $\alpha$ and leads to a wedge-shaped cavity L having an opening located between the leading edges of rails f, g, respectively. The wedge-shaped cavity L is typically about 350 u" deep and has a closed end m located adjacent the flat air-bearing surface h. There is one, or several, magnetic transducer(s) fixedly mounted at the trailing edge d of the body 11. Each magnetic transducer is positioned with its R/W gap adjacent to, and aligned with, the flat air-bearing surface d. Now, here, a pair of spaced parallel "relief slots" P, R are formed through the trailing edge d of slider body 11. Slots P, R extend in a direction substantially parallel to the spaced parallel support rails f, g and communicate with ramp surface k.

Of course, one must guard against detritus clogging slots P, R or cavity L (e.g., this can lead to a catastrophic head crash). Now, some detritus build-up is virtually certain with such sliders. For instance, the best filters ["99.999%" type] correctly used with such equipment will customarily exclude all atmospheric contaminants larger than about 12 u". This should eliminate most smoke particles (usually ~250 u") . But smaller air-borne contaminants abound and can readily build-up in shallow cavity L (especially at its trailing edge) and-/or in slots P, R [e.g., commonly: oil vapor from the disk drive bearings, particles from the media—also smog, atmospheric dust and fumes, rosin smoke, metallurgical dust and fumes, viruses, etc.]. Thus, the art needs a better contaminant-free slider which avoids, or mitigates, such problems (e.g., better than the "slotted" model of FIGS. 1-4). This is a salient objective of my invention.

Thus, as one feature hereof, an improved, more contaminant-free flying slider is provided with a "back-bar" and associated transverse flush-cavity (purge channel) adapted to better accommodate multiple heads at the lowest point of slider's flying face (above disc), to reduce pitch angle, to better "flush" the slider (cf. more reliable way of keeping "negative-pressure-orifice" clean), to facilitate fabrication of thin film heads (lower cost, yet high reliability due to accuracy of masking techniques), and to effect improved "purging" (at the R/W gap).

BRIEF DESCRIPTION OF THE DRAWINGS

These and other features and advantage present invention will be appreciated by workers as they become better understood by reference to the following detailed description of the present preferred embodiments which should be considered in conjunction with the accompanying drawings, wherein like reference symbols denote like elements.

FIG. I depicts, in side schematic view, a "comparison model" as a "modified Winchester" type slider riding above a disc surface, this slider being shown in perspective in FIG. 2, in plan view in FIG. 3 and end-view in FIG. 4;

FIGS. 5 and 6 depict, in like schematic view, a "self-loading" type slider embodiment modified according to the invention, with a side view-thereof in FIG. 7 and an end-view in FIG 8;

While FIGS. 9A and 9B indicate an idealized pressure-profile along respective axes of this embodiment, with FIGS. 10 and 11 indicating related idealized relationships of head flying height and pitch angle (vs load)

FIGS. 22, 23 are plots of slider flying height vs velocity, and vs load, respectively;

FIG. 25A is a "test plot" of disk surface roughness (acoustic emission sensor output) across a given disk radius; while

FIG. 5' is a plan view of a related 3-boss embodiment;

FIG. 6' is a plan view of a related 2-rail embodiment;

FIG. 12' is a plan view of an embodiment like that of FIG. 6' where the bosses are deformed by lapping or cold-worked; and FIGS. 13' 14', 15' and 16' represent plots, for certain embodiments, of "particle count" vs. "stop-start test time".

DESCRIPTION OF PREFERRED EMBODIMENTS

General description, background

FIGS. 5-8 schematically illustrate a "self-loading" type slider assembly 20 constructed and modified according to principles of this invention. This, and other related techniques and means discussed for all embodiments, will generally be understood as constructed and operating as presently known in the art, except where otherwise specified. And, except as otherwise specified, all materials, methods and devices and apparatus herein will be understood as implemented by known expedients according to present-good practice.

More particularly, FIGS. 5-8 will be understood as schematically depicting such a slider 20 which is improved, according to the invention, to include a prescribed "full back bar" 21 and associated "purge channel" 23 extending transverse to the direction of flight (arrow)—e.g., compare the "slotted" slider in FIGS. 1-4. Slider 20 will be recognized by workers as otherwise conventional, comprising a ceramic body 1 with a leading edge portion 20-L and a trailing edge portion 20-TR, a pair of (positive-pressure) side-rails 20-R, 20-R' (including projecting ramped lead-tips 20-T, 20-T'), plus a very shallow interior aerodynamic cavity 20-C (or "negative-pressure channel") of prescribed precise dimensions (usually, up to several hundred $\mu$-in.).

It has been found that surprising effects may be produced by a prescribed extension of the slider length to accommodate a "back-bar" 21 and intervening "purge channel" 23 of proper dimensions, designed to reduce the pressure to zero (atmosphere)—and yield such effects as flushing the dirt particles away from the transducer end.

In particular, this allows multiple transducer means to be located anywhere across the "back bar" (compared with conventional sliders as in FIG. 13). This "back-bar" extends the full width of the slider (trailing edge)—i.e., to be a "full back bar" (no advantage to less than full width) and it may be of any suitable width (along direction of axis A) depending on pitch angle required (e.g., here, several mils width was found suitable).

Figure 17:
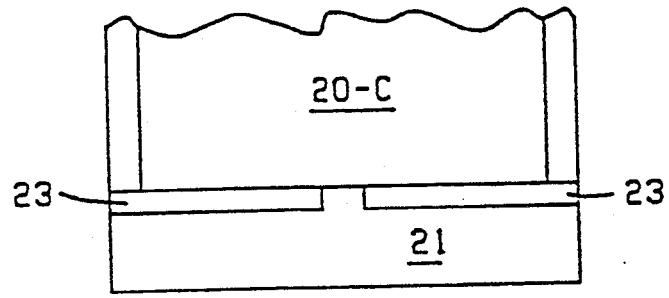
FIG. 17 is a partial plan view of a modified embodiment.
Figure 18:
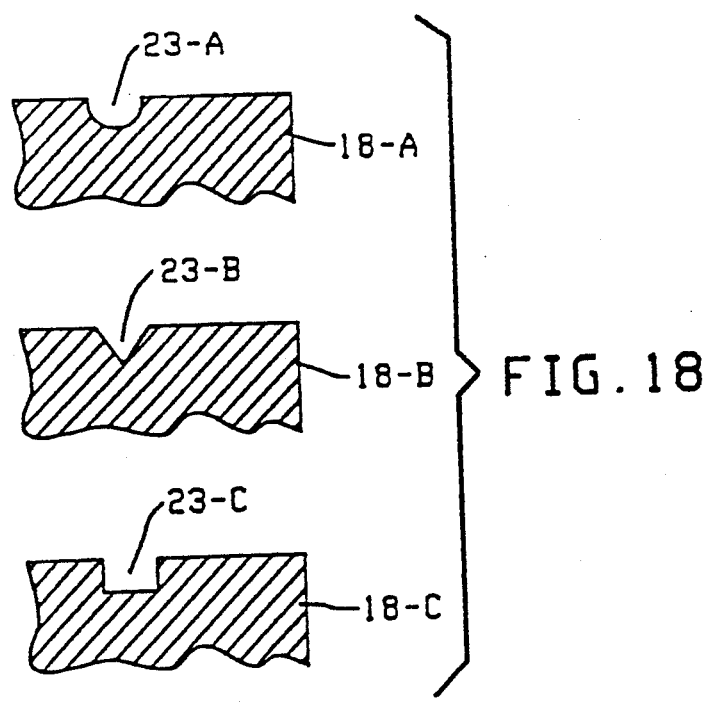
FIGS. 18A, 18B, 18C are partial side views of modified purge-channel cross-sections.

The "purge channel" 23 is cut just upstream (forward) of the back-bar 21 along the slider face 20-f. Channel 23 will be located (along axis A) such as to 1 terminate cavity L and to distribute positive and negative (dynamic) forces as understood by workers. Channel 23 will in some instances be cut in two segments (e.g., as schematically suggested in FIG. 17, for fabrication convenience, etc.—a non-preferred case however; FIG. 17 to be read like FIG. 5). Channel 23 may be cross-sectionally shaped in the rectangular mode of FIG. 7 (square-corners; e.g., for fabrication convenience) of virtually any other shape (e.g., see alternatives 23-A, 23-B, 23-C in FIGS. 18A, 18B, 18C, respectively)

For instance, satisfactory operation has been observed with a self-loading slider like slider 20 (FIGS. 5–8) about 170 mils in length L ($L_c$=93 mils) by 40 mils in height h ($h_c$=25 mils), by 110 mils in width w ($w_c$=80 mils); with rails having a width $w_r$ of about 15 mils [ramp $h_p$ about 0.175 mils in height $h_r$; tips 20-T about 20 mils in length, $t_e$—bar 20-L about 20 mils in length, $f_e$] with inner "flying-cavity" 20-$c$ about 500 micro-inch in depth $d_c$ and 80 mils in width $w_c$.

For this slider, under relatively conventional "flying" conditions (e.g., disc surface-velocity about 1500 inch/-sec), it is found satisfactory to make "back bar" 21 about 5 mils wide ($w_b$) and "square" in cross-section (cf. FIG. 7) with a purge channel 23 about 0 mils wide ($w_p$) and about 4 mils deep ($d_p$) and "square-cut". This afforded a stable flying height of about 5–7 micro-inch (at trailing edge, along back-bar), and showed fine "self-flushing" characteristics—such that workers would likely be surprised.

Operation of Preferred Embodiment (see FIGS. 9-13)

Figure 12:
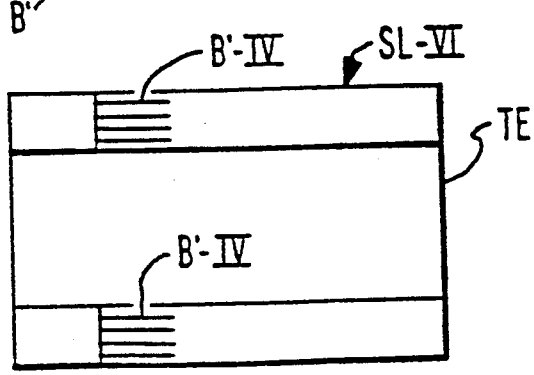
FIG. 12 schematically indicates operational attitude (side view) of such an embodiment, while FIG. 13 indicates the same without the invention.
Figure 4:
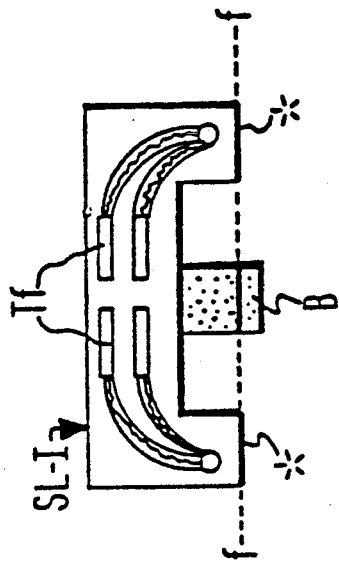
Figure 3:
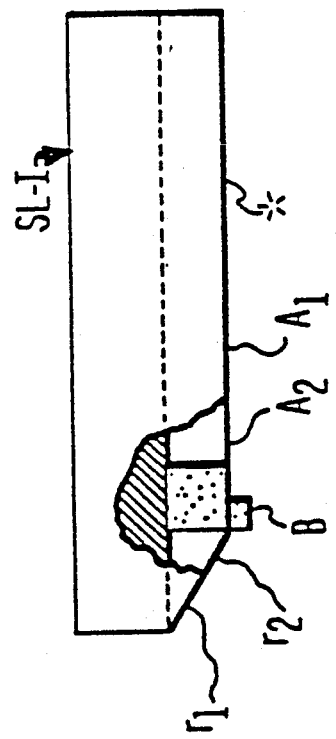
Figure 2:
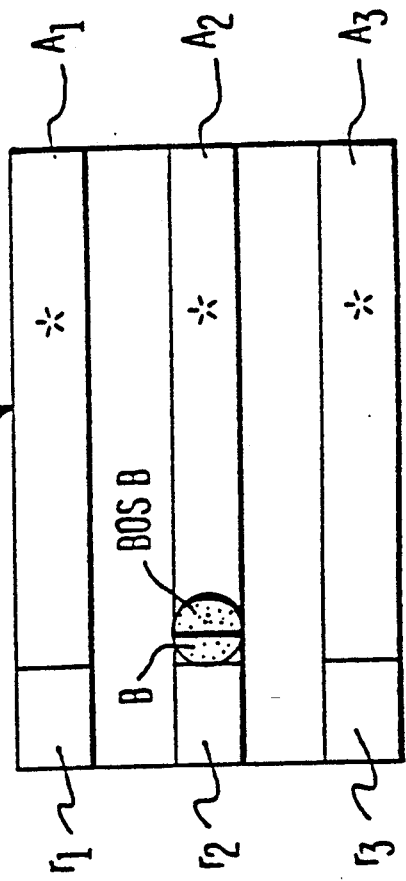

FIG. 12 diagrammatically suggests how such a slider 20 is intended to function, as opposed to a like slider 30 lacking the "back-bar" and "purge channel" (both sliders assured to be flying above a disc at a desired attitude, for read write operations). The trailing corner 31-Tc of conventional (self-load) slider 30 in FIG. 13 will-be visalized as-allowing relatively little air (compressed by slider flight) to escape, and will be seen as approaching so close ("trailing corner" 31-Tc of flying-face 30-$f$ at trailing-edge 31) to the passing disc surface (see plane M'—M') as to readily be occluded by debris build-up—such as to "block" the desired, necessary purge of its "negative-pressure-channel" 30-c.

By comparison, when analogous embodiment 20 is provided with a back-bar 21 and associated purge channel 23 (see FIG. 12) to purge its "negative-pressure-channel" 20-c of debris, air can readily and quickly escape to atmosphere, so the slider 20 may purge itself of debris quite easily. [Note the relatively "massive" dimensions of purge-channel 23 compared with the miniscule depth of n-p channel 20-c.] Such "purging" along such a relatively massive channel (cut transverse to the flying direction) is found different from (and superior to) the proposed design air escape configurations such as "parallel slots" (cf. FIGS. 1–4 and "slots" P, R). This proposed design is not as practical or economical, etc., as I would like.

Thus, this "full back-bar/transverse purge channel" design improves operational and other characteristics of the usual "self-load" slider, giving a massive air purge conduit across to the air bearing surface (to very effectively flush cavity 20-c ) and parallel to the back-bar. The "positive pressure" and the "negative pressure" regions provide the "net load" across the air bearing surface (compare FIG. 9 with FIG. 5). The positive pressure surfaces (along axis B; cf. FIG. 9B) fully flank the medial negative pressure area (e.g., along axis A; cf. FIG. 9A). The resultant (net, loading) force due to these pressures provides a relatively constant load over the slider bearing. Changes in air flow or disc will have a negligible effect on this loading; hence, a more stable air bearing surface is realized.

The positive loads due to positive pressure distribution along the side rails and the "back-bar" control the "bearing stiffness" of the slider. The sum of these positive loads tends to increase the "net load", resulting in a higher air-bearing-stiffness (see FIGS. 9A, 9B for pressure profiles plotted along axis A, axis B of slider of FIG. 5—FIG. 10 is a comparable plot of flying height vs load for like "self-load" back bar-equipped sliders, ZL FBB (Zero Load, Full Back Bar) with flying cavities of different depths).

Workers will note that as cavity depth (cd), increases the flying height (fh) increases and becomes less linear vs load change—and tends to approach the characteristics of a more conventional slider OW (ordinary Winchester, no Back-Bar). Note: cd of such ZL FBB sliders determines fh—something novel in the art—also, suction decreases as cd increases. Thus, a worker would likely prefer a MIN cd design (e.g., 100 u"); however for ease and reliability of rendering such miniscule "cd cuts", we prefer a cd of about 300 u" (or slightly more).

The positive pressure distributed along the back-bar surface will increase slider stiffness. This added stiffness will tend to improve control of the slider and inhibit undesirable "roll" (e.g., about axis A, FIG. 5). The presence of such positive back-bar pressure also acts to reduce the "pitch restoring moment", and thus reduce "pitch angle" (see FIG. 11 which pitch angle is plotted vs load for such a "zero load full back bar" slider (ZLFBB) vs OW, as in FIG. 10) at various flying-cavity depths).

Workers will be surprised to note that, unlike the ordinary slider, such "back bar sliders" are so relatively insensitive to changes in load (especially the smaller cd, at least for such minor load changes). A like (surprisingly) insensitivity to disc-velocity is also observed.

Figure 11:
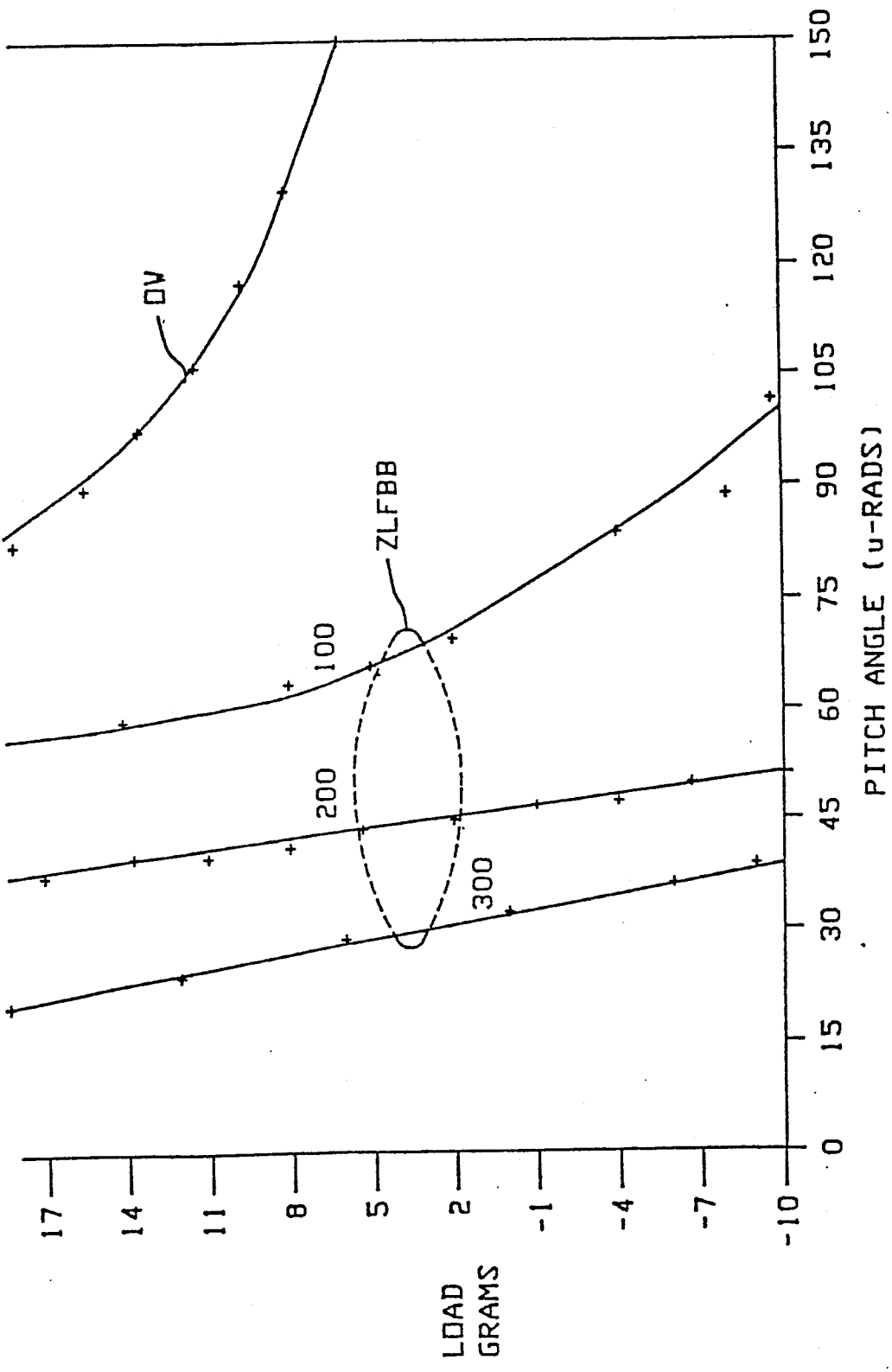
Figure 22:
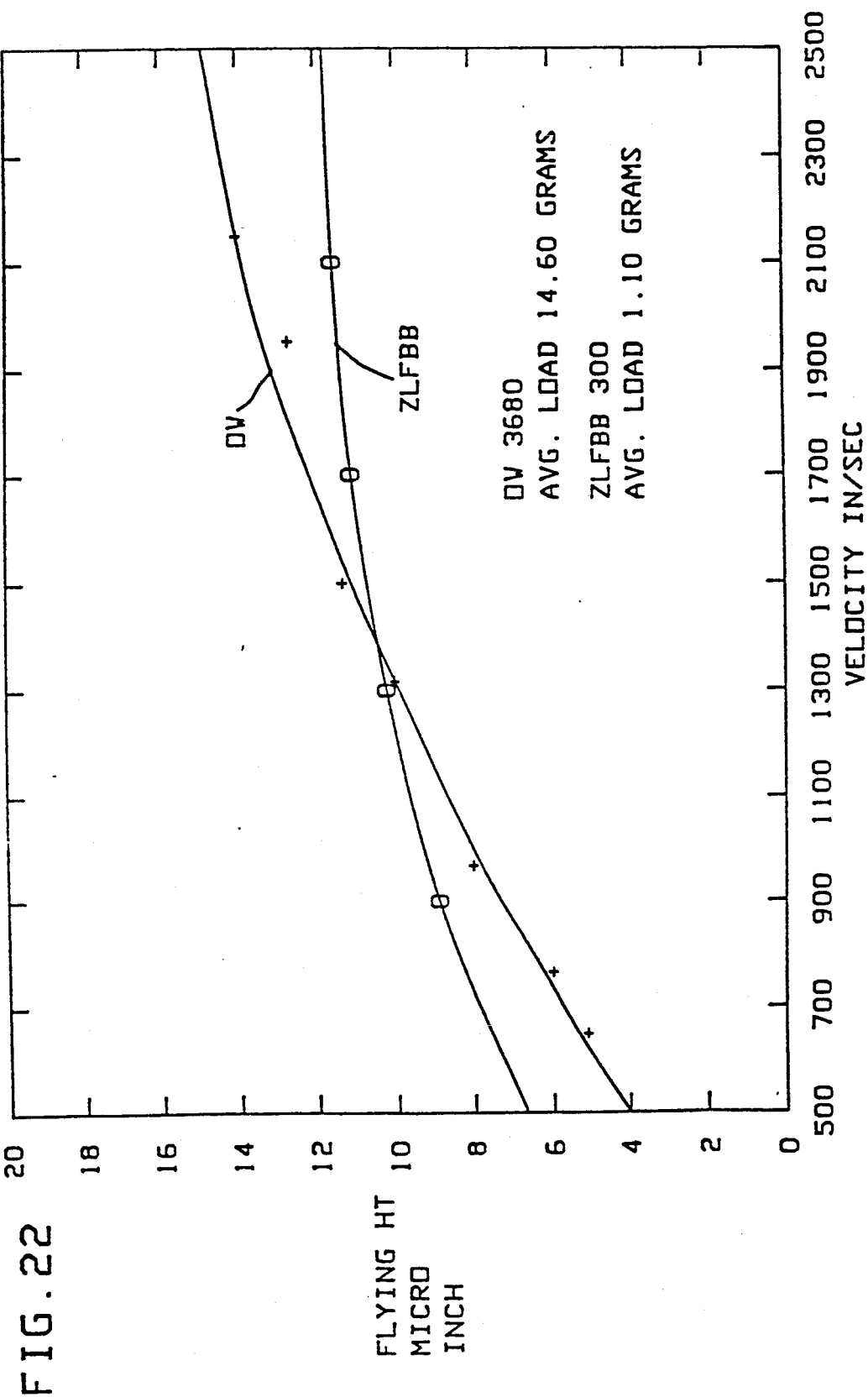
FIGS. 22, 23 indicating flying height vs velocity, load, respectively.
Figure 23:
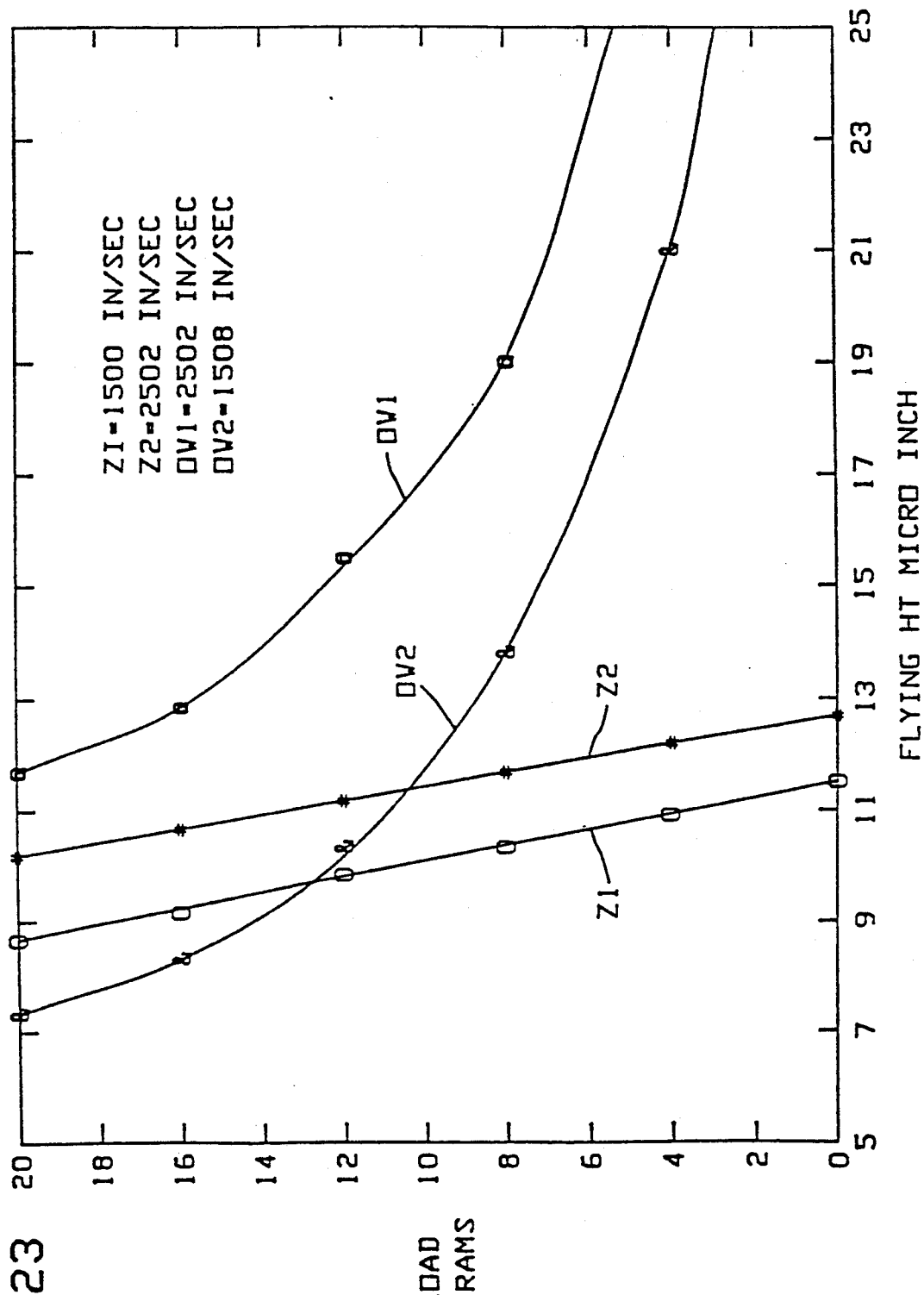
Figure 10:
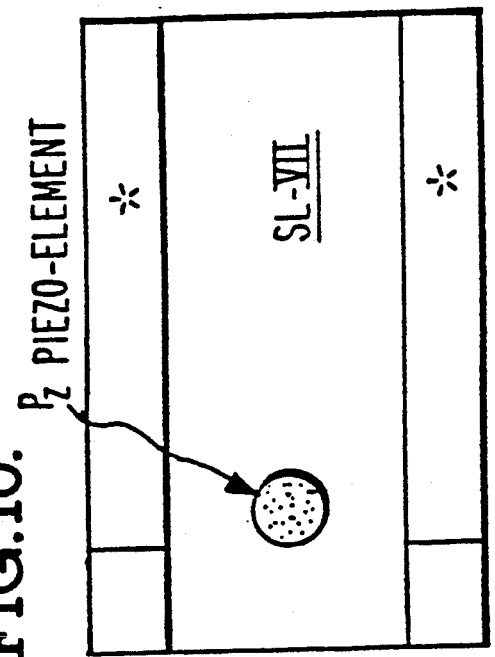

This is seen in FIGS. 22, 231 which plot flying height (fh) vs velocity and load respectively for a zero load full back bar sl (ZLFBB, assume 300 u" cavity) vs an ordinary slider OW (no back bar), as with FIGS. 10, 11 above mentioned. Surprisingly, it will be evident that the ZLFBB is considerably less sensitive to such disc velocity changes (FIG. 22—despite carrying a small fraction of the load OW carries). Similarly, a pair of ZLFBB sliders $Z_1$, $Z_2$ (assume 300 u" cd; 22 mil rail-width) exhibit relatively little sensitivity to (minor) load change as compared with more conventional (no back bar) sliders $OW_1$, $OW_2$; even despite varying velocities (about 1500 ips for $Z_1$, $OW_2$; about 2500 ips for $Z_2$, $OW_2$; about 2500 ips for $Z_2$, $OW_1$).

Operating with the Mentioned slider embodiment (cf. disc velocity of 1508 in/sec; positive pressure rails 15 mil wide and 500$\mu$-inch negative air-pressure cavity), an escape passage 23 as in FIGS. 5–8 and 10×4 mils in cross section (for a flying height of 5 to 7 $\mu$-inch under the back-bar) increased bearing stiffness (e.g., by about 10%), gave better control and less "roll", while reducing "pitch angle" (e.g., from 130 u-radians to 90 u-radians).

Figure 14:
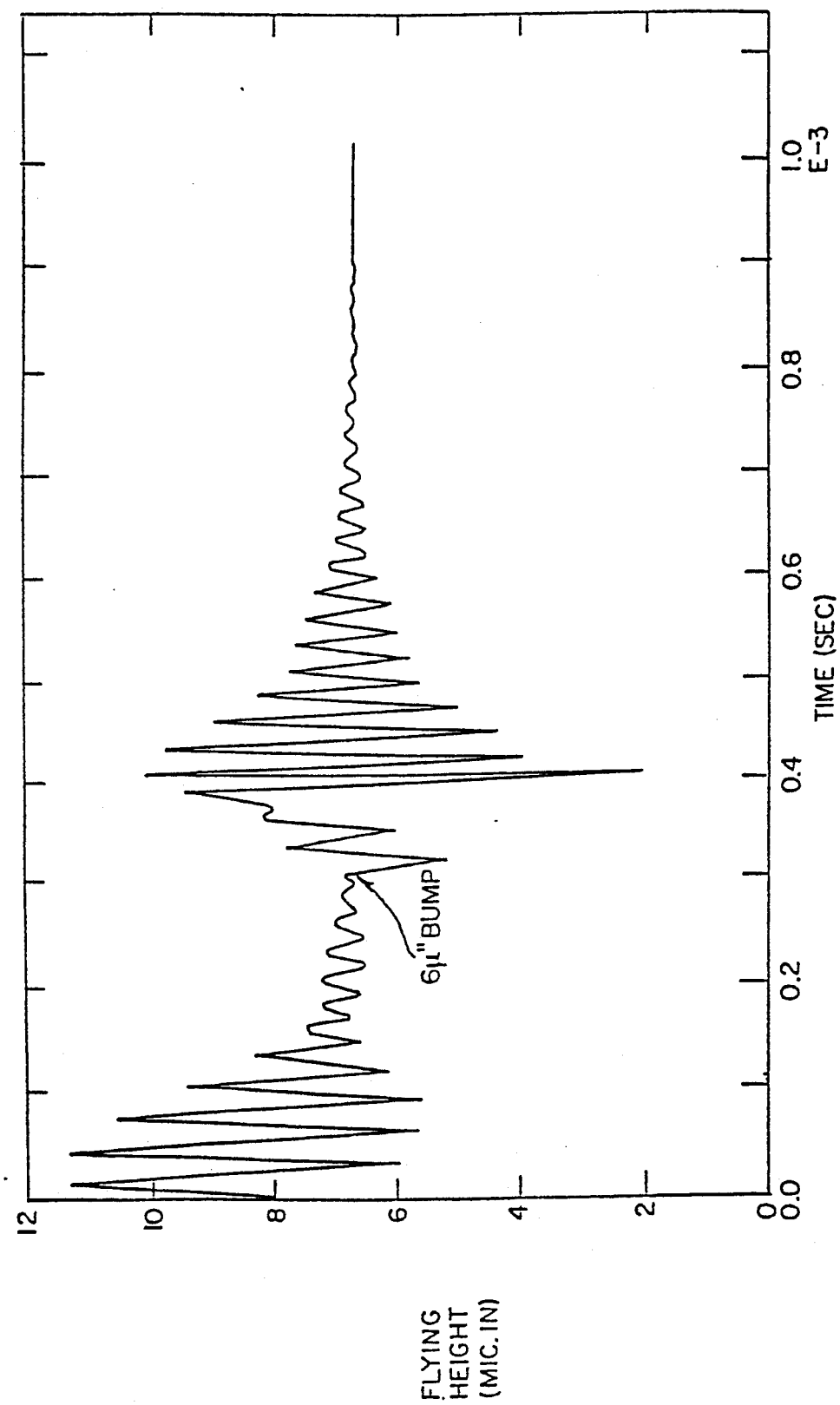
FIGS. 14 and 15 plot flying height vs time over a 6 u" bump for two "purge channel" depths in such an embodiment.
Figure 15:
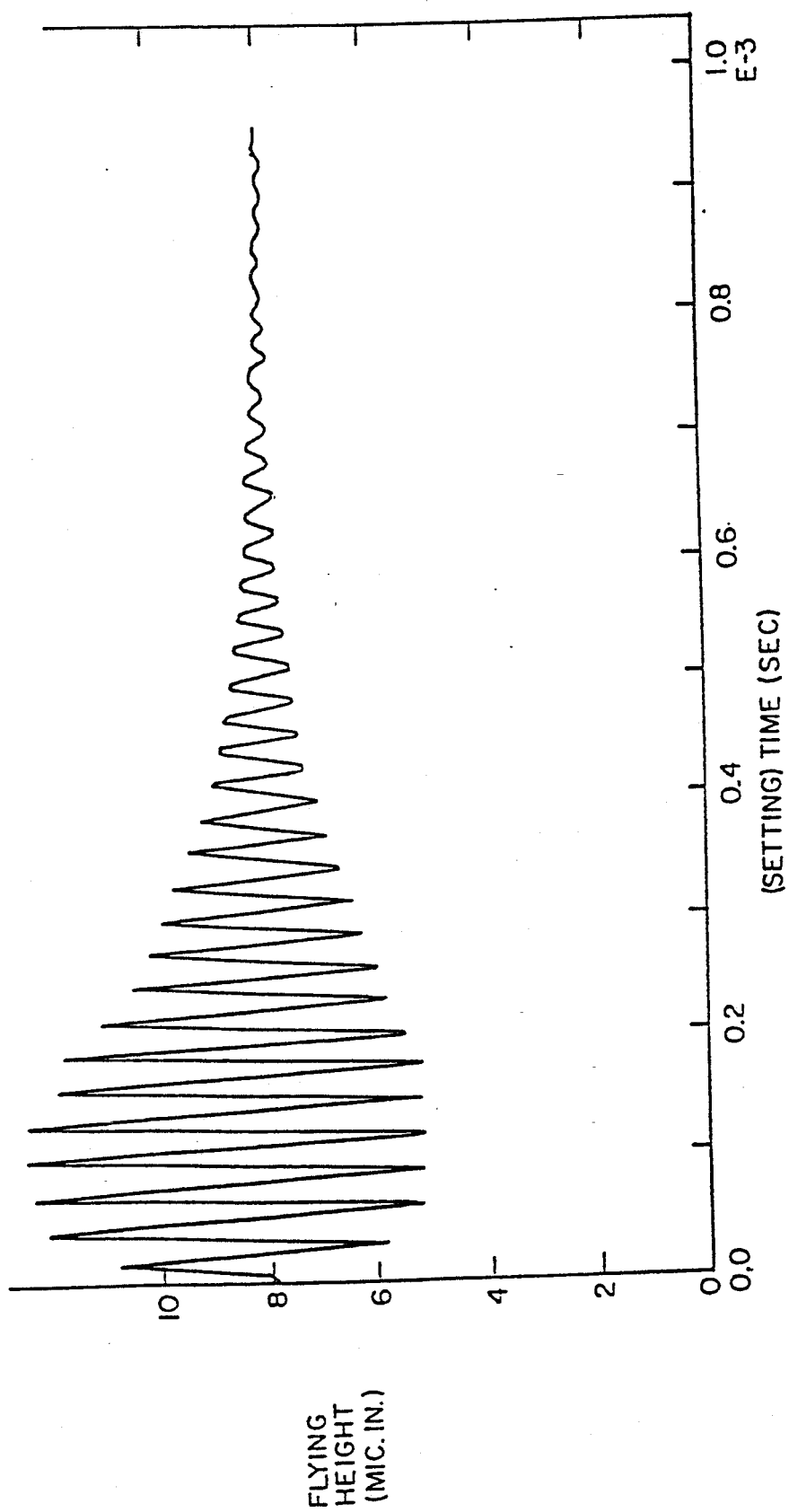

Tests of Modified Embodiments (FIGS. 14, 15)

FIG. 14 is a plot of "flying height" (in u") vs time for a comparable (back-bar equipped) slider as it is made to traverse a miniscule bump 6 u" high [here, the "flying-cavity" 20-c is only 200 u"; flying at 1508 m/sec at a height of 6.8 u" and a load of negative 10 gm.]. FIG. 15 is a like plot under the same conditions [except cavity 20-c is 500 u"; load of +1 gm; slider displaced from flying height of 8 u" by test force]. Workers will agree that the setting time of 0.00038 in FIG. 14 and of 0.0007 in FIG. 15 indicate fine stiffness.

Alt. Embodiment (FIGS. 20, 21)

Figure 6:
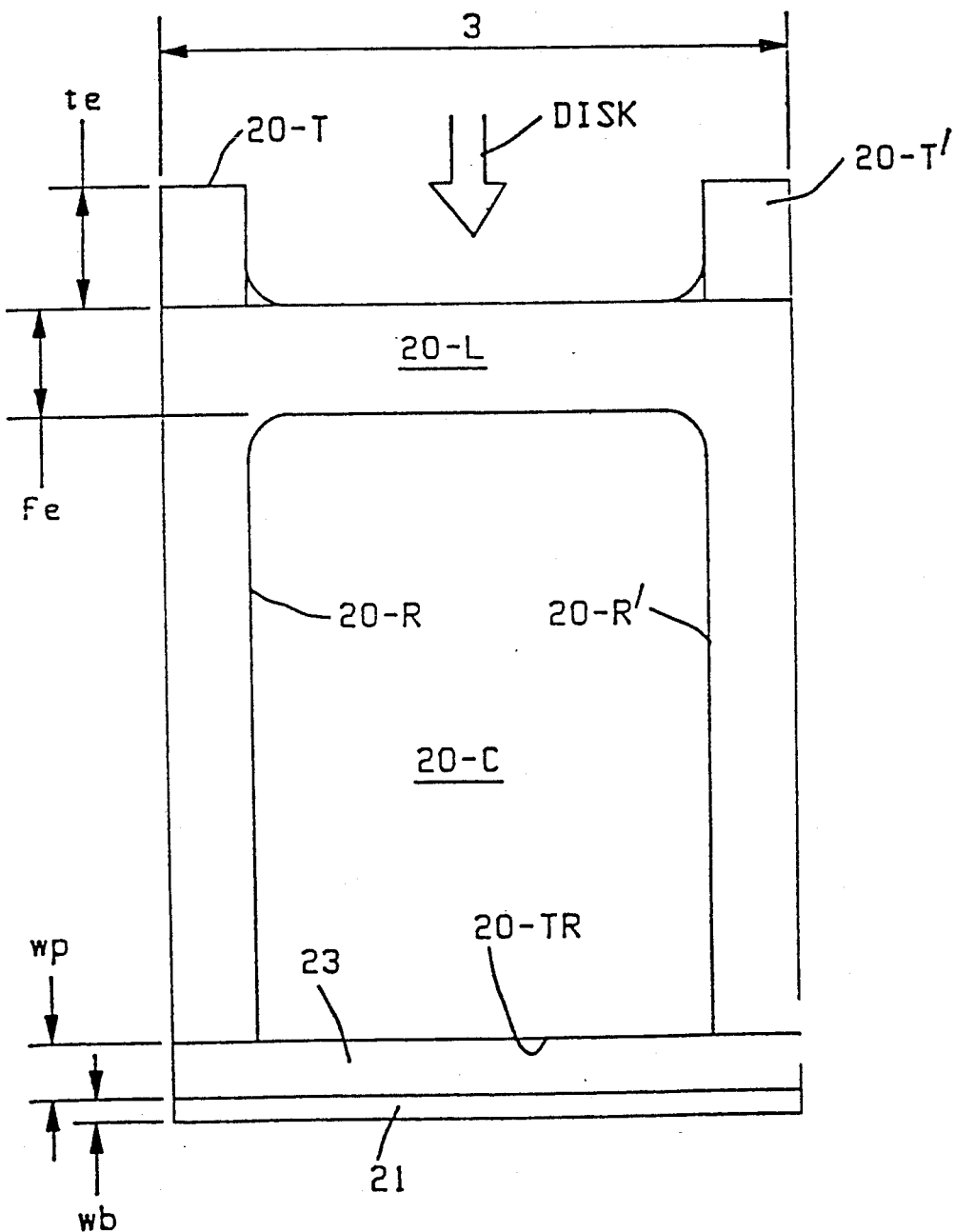
Figure 7:
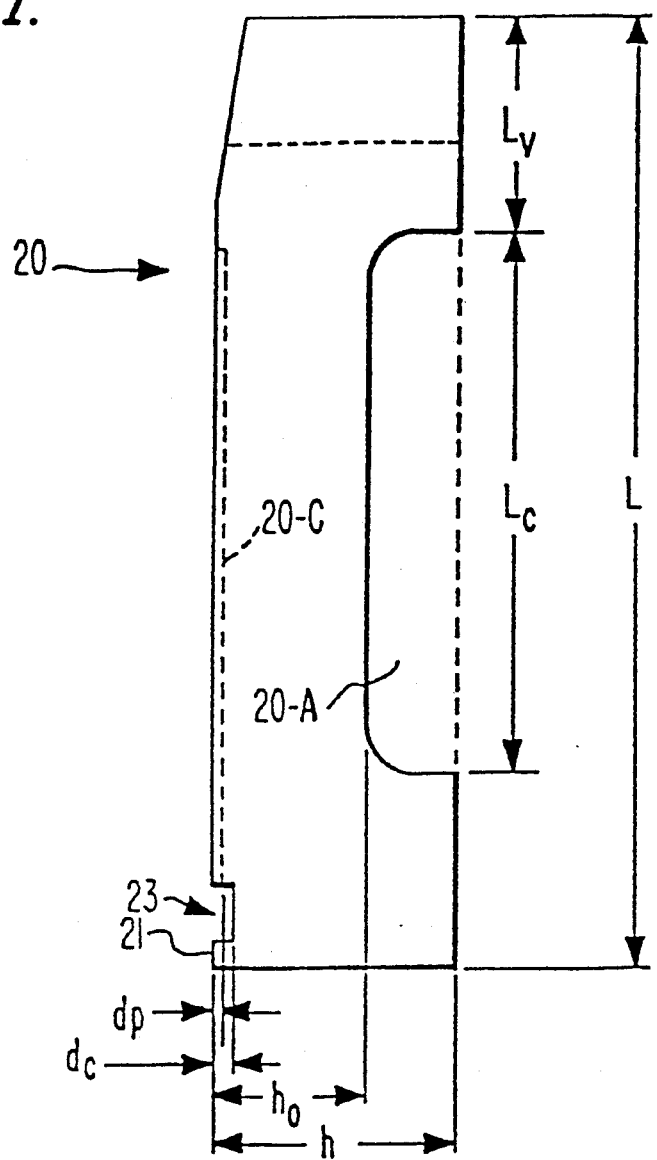
FIGS. 7' and 8' are respective plan and side views of a related "medially-mounted" boss embodiment.
Figure 8:
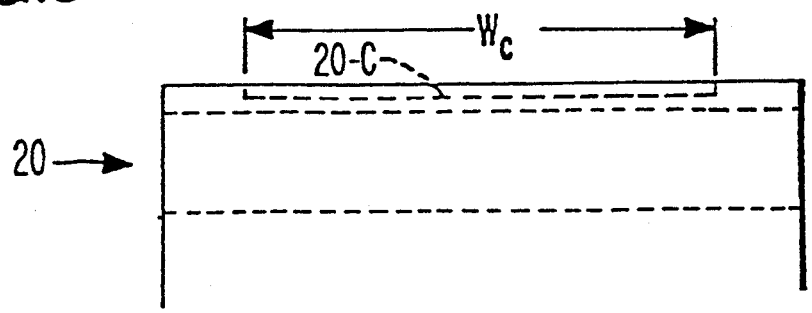
Figure 20:
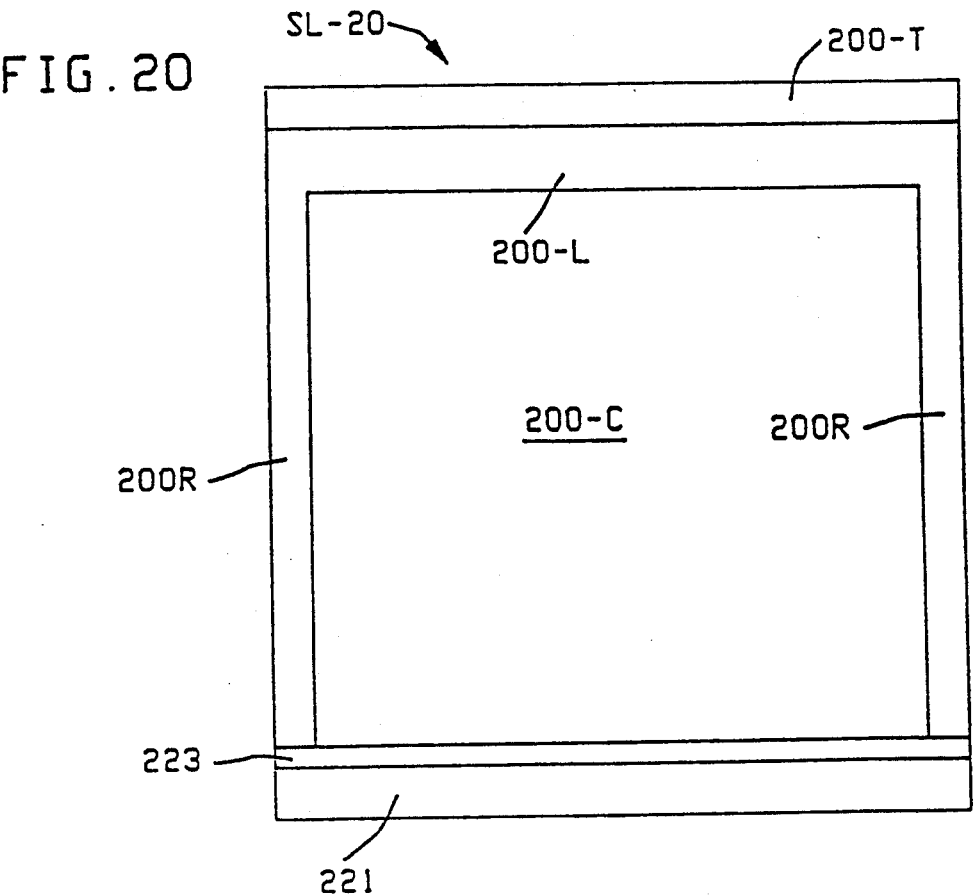
FIGS. 20, 21 are respective plan, side views of yet another embodiment.
Figure 21:
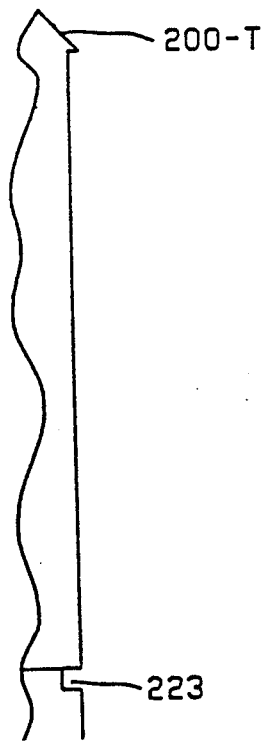

FIGS. 20, 21 schematically illustrate another alternative slider SL-20 (modeled after slider of FIGS. 6, 7—but with full-width ramp 200-T). Here, it was found that a certain pitch angle was too great to yield good flying (height) stiffness so increasing the width of back-bar 221 (empirically, as workers will perceive) until pitch angle was properly decreased cured this problem.

Figure 16:
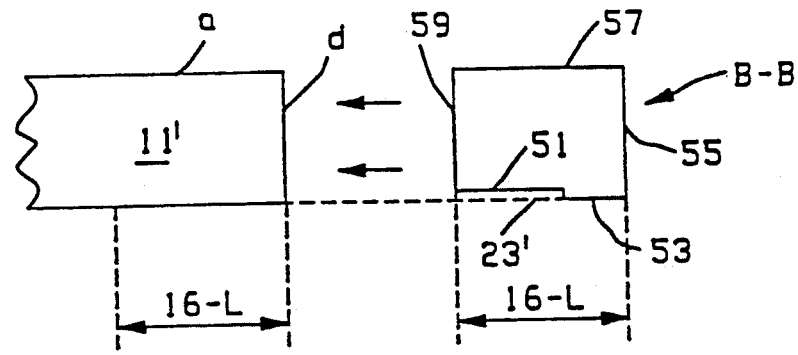
FIG. 16 depicts, in schematic side view, a "back-bar attachment" embodiment.
Figure 19A:
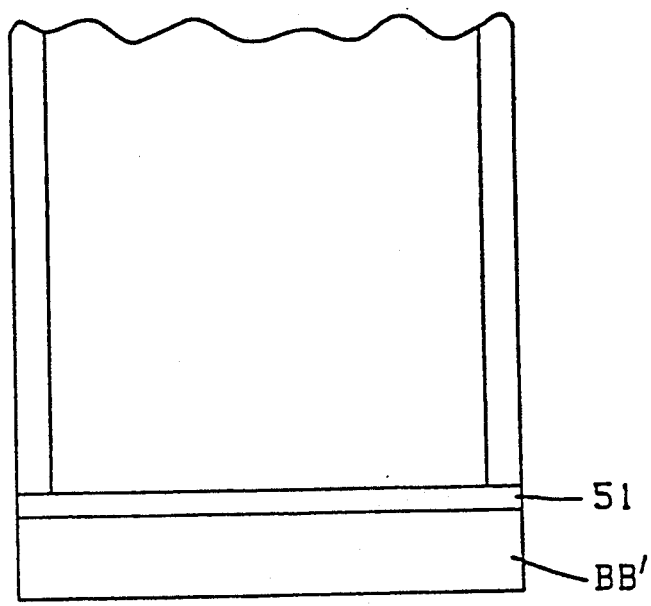
FIGS. 19A, 19B are respective plan, side views of an embodiment like that of FIG. 16.
Figure 19B:
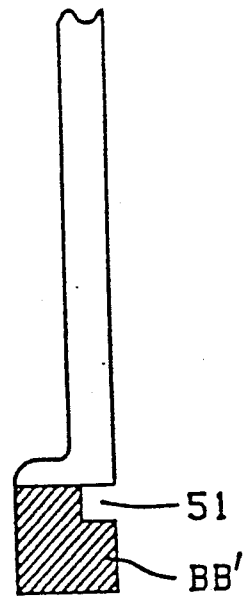

Modifying Winchester Slider (FIGS. 16, 19A, 19B)

A Winchester slider (e.g., like that shown in FIGS. 1-4) can also be modified to simply append such a "back-bar" and associated "purge channel", with the same sort of performance enhancement, cost-savings, etc., For instance, an "add-on" ""back-bar/purge channel" arrangement BB as schematically depicted in FIGS. 16 could be affixed at the trailing edge of a winchester slider like that in FIGS. 1-4 [here, assume the slider 11' in FIGS. 19A, 19B; FIG. 19A being a plan view like FIG. 3 or FIG. 6; and FIG. 19B a side view]; after cutting-off a trailing section of comparable length 16-L (FIG. 16).

Figure 2:
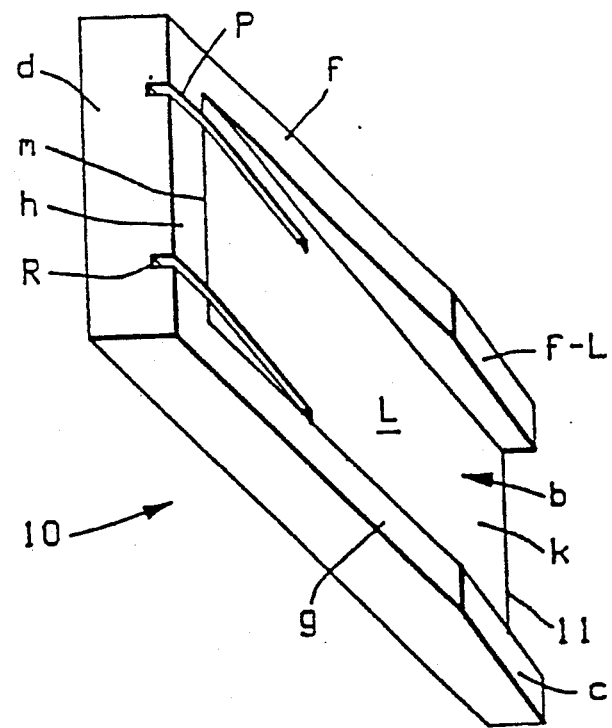
Figure 3:
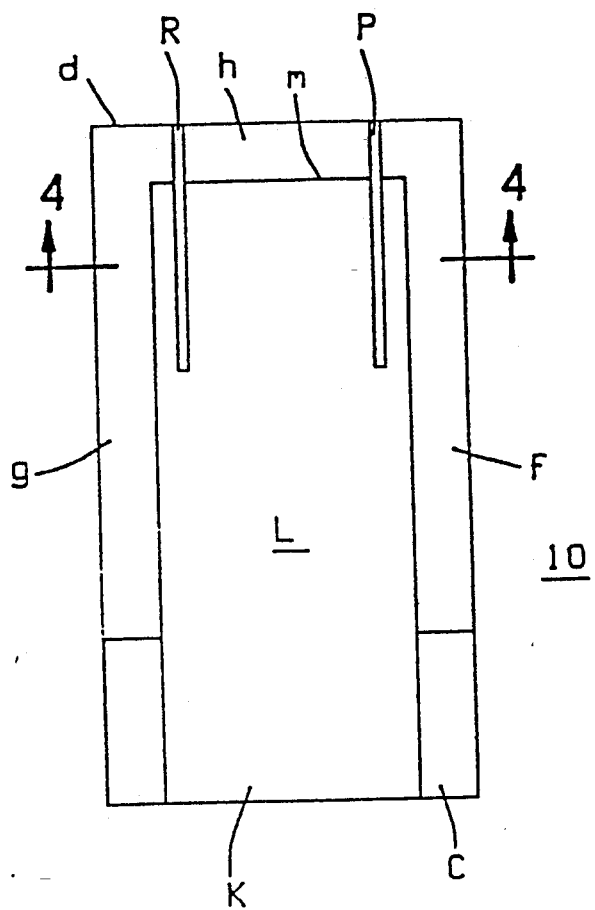

More particularly, referencing to slider 11', an "extension" B—B thereof is depicted in side-view in FIGS. 16, 19B, to be understood as adapted for attachment along the entire trailing-face of slider 11', with Lead-face 59 of attachment BB understood as joined to face d, the "trailing face"—see FIG. 2 also, with the "wall h" being cut-away to open-up the exit from cavity L, between slots P, R [face 59 being congruent with face d except for a channel cut-out therealong at 51, channel 51 being cut-into bearing-face 53 of B—B, which will thus extend the bearing-face of slider 11' and eliminate wall h]. Thus, attachment BB will be understood as leaving slider 11' with the same effective-length, and providing a new trailing-face 55 (vs prior face d), along which transducers may be sited at will. The associated purge channel 51 will be understood as cut-out along flying-surface e 53 of the attachment B—B (affording a better flying stability—e.g., at flying height of 35-45 u").

Of course, alternatively, the slider may be originally fashioned to include such a purge channel/back bar combination.

Moreover, it should be appreciated that, with such a "full back bar", one can better realize the cost-saving potential of associated thin film beads—no added hand labor for winding heads, etc. An array of thin film heads can fill the entire back bar, with no limit on their number (except for size and economic limitations). And the associated purge-channel introduces an escape passage to better keep the "negative-air-pressure-exit" free of debris.

Thus, workers will note that use of such a "full back-bar" and "transverse purge channel" on a slider allows a great number of heads to be disposed at lowest (flying) point of the slider, how it reduces pitch angle, how it minimizes the risk of debris blocking the negative-pressure-orifice, how it makes it less costly to fabricate a slider with thin film heads (enhancing reliability due to the precise-locating resulting from associated thin film masking techniques), and how it can afford a helpful "purging effect" at the R/W gap.

"boss"

Workers in the art of magnetic disc recording for computer memory and related purposes are familiar with certain problems suffered by the magnetic head sliders used to present the transducer means to the rotating disc. One problem is that of "stiction" (forces) developed when a slider is resting on the magnetic disc surface (e.g., on a lube film thereon). Stiction forces can be undesirably large and counter-productive, especially under the "sudden start" conditions usually desired—e.g., overloading the disc-rotating motor—[they can lead to damage to the slider and/or to the disc surface].

Stiction can commonly induce a transfer of disc-material onto the slider rails; at times causing a flying slider to crash into the disc and render it useless. Such crashes become more and more likely as sliders are made to fly lower and lower [presently as little as about 20 micro-inches above the disc, a flying height which obviously can lead to disastrous problems if just a few micro-inches of material is picked up on a slider rail]. It is an object of this invention to ameliorate such problems by providing anti-stiction boss means arranged to protrude below the surface of the slider.

Such stiction and related problems are exacerbated by the current trend toward reducing "lube thickness". Conventionally now, a disc surface is lubricated with a somewhat uniform coating of an industry-standard polymer (e.g., by Brayco, Krytox, etc.) normally, at least 50-70 Å in depth—being depleted in use to about 11-20 Å, which approximates a mere monoatomic layer and thus is thought to be as thin as possible for such a continuous film. A head/medium interface that requires no lubrication at all would be "ideal" and would avoid such depletion and attendant "crash" incidence. But, for the present, workers insist that some sort of lube is needed to reduce interface friction.

Thus, some lube is believed necessary—e.g., to prevent a slider from prematurely "gouging" or otherwise marring or digging-into the disc surface, and soon "crashing". Conventional sliders (e.g., 3680 Memorex DD) conventionally operated (50 Å film of lube) are expected to have a useful life of about 10,000 stop-start cycles (cf. a contact start-stop test is widely accepted as a measure of media integrity). "Low-lube" conditions reduce this to the order of a mere 1,000 cycles; (unacceptable in the industry). Workers theorize that a "crash" is often presaged when disk-coating material is transferred onto a slider surface—commonly because too much heat is developed by rubbing of the slider against the disc coating (such overheating evidently breaking-down the coating binder constituent and allowing the slider to pick-up disc coating matter).

Workers would like to reduce lube thickness (well below the mentioned 50-70 Å). But such "low-lube" conditions are not yet acceptable. They are viewed as attenuating the useful operating life of a disc-slider combination. For instance, we have seen lube applied in the 20-60 Å range limit operating life to about 1,000 start-stop test cycles, whereas an "acceptable" operating life to workers corresponds to about 5,000-10,000 cycles or more [Note: one start-stop cycle will be understood as initiated when a slider at rest is made to speed up and take off to over-fly the disc and then land thereon to be returned to rest].

It is a further object of this invention to ameliorate these difficulties and allow workers to not only overcome stiction and related problems with conventional lube levels but to do so under "low lube" conditions and under conditions allowing sliders to fly ever closer to the magnetic disc surface and still survive 10K contact start-stop cycles. This is proposed by providing the mentioned boss means on the slider.

In thinking of ways to relieve the mentioned "stiction" problems, a number of approaches come to mind. For instance, one might consider changing the traditional "circular" path of the slider about the magnetic disc to an elliptical path. This might reduce stiction effects (by imparting a centrifugal force to separate the slider from the disc), but such a solution seems difficult to implement and might present undesirable side effects.

Or, one might curve the slider air-bearing surfaces (rail faces) to reduce plane-to-plane contact with the disc. However, such a curved surface is not easy to visualize and design and is problematic to manufacture in quantity (consistent with yielding a slider that will fly stably just a few micro-inches above a disc). Moreover, the resulting converging/diverging air-flow paths could well make the slider unstable.

Or, one might apply a high frequency vibration to the slider disc-just before "start-time" to release the "stiction bond". This has been tried but is not viewed as reliable.

Or, as revealed in the IBM TDB Volume 25, #9 Feb. 1983, one might heat the disc lubricant to reduce its viscosity and thereby hope to reduce stiction. However, this is somewhat impractical, e.g., since it requires special heating means and related power and indicates problematic residual thermal stresses in the slider suspension system [flexure, load beam, etc.].

Thus, the art is still awaiting a practical solution to "stiction" and related problems; a solution which is simpler to implement than the foregoing and which avoids their undesirable side effects. Our invention provides "anti-stiction bosses" as such a solution. For instance, our technique is very simple to implement and brings no significant adverse side effects. In fact it has been somewhat surprising that such a simple boss means could solve these problems and that such a protruding boss could skid along the disc surface without injuring either itself or the disc. It was also surprising to realize some other advantages using this boss means, such as shorter, quicker "lift off" from the disc, relief of excessive stiction even under "heavy-lube" conditions, and allowing a "low-lube" disc to achieve satisfactory operating life.

"boss" in general

Figure 1:
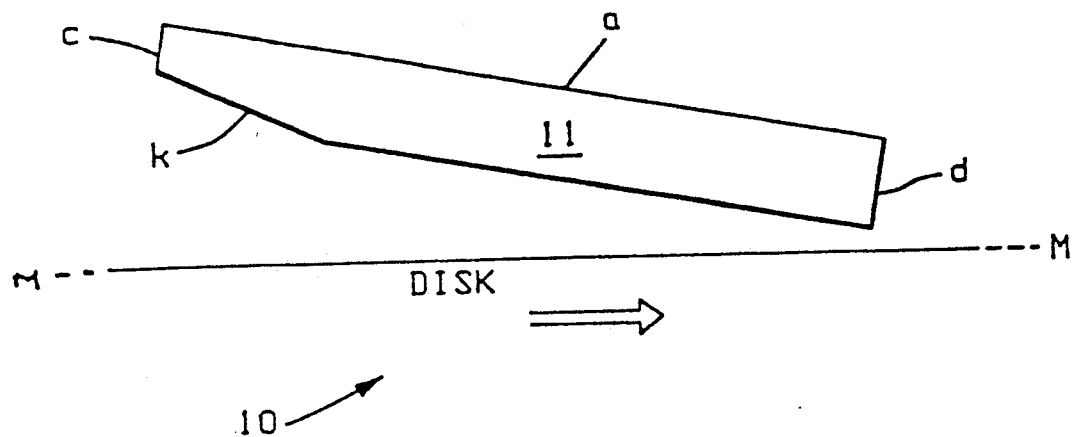
FIG. 1'A is a schematic elevation of a representative slider embodiment provided with a boss means as shown parked on a magnetic recording disk, while FIG. 2' is a plan view, FIG. 3' a side view, and FIG. 4' an end-view of this slider.

FIGS. 1'-4' schematically illustrate a magnetic recording slider SL constructed and improved to include boss means according to principles of this invention. The slider, and related means discussed herein, will generally be understood as constructed and operating as presently known in the art, except where otherwise specified; the materials, methods, and devices and apparatus being implemented by known expedients according to present good practice.

Thus, FIG. 1' depicts a conventional slider SL-1 resting on an associated magnetic recording disc with a protruding "boss means", or metal slug B, raising the forward end of the slider off the disc surface. As better seen in FIGS. 2', 3' and 4', slider SL-I will be understood as a relatively conventional three-rail "Winchester" slider, e.g., of the type used with a high speed disc drive, such as the Memorex 3650. The slider is understood to carry thin film transducers tf (FIG. 4'), mounted at, or adjacent, its trailing edge TE as known in the art. The three slider rails $A_1$, $A_2$, $A_3$ may be the order of 0.145 inch wide and include conventional ramp sections $r_1$, $r_2$, $r_3$, respectively, disposed forward of their leading edge portions. As workers know, the disc-confronting faces of the rails define a prescribed "flight-plane" f—f (see FIG. 4'). Boss B will be understood as a tiny protrusion (e.g., relatively cylindrical or rectangular) projecting about 6 micro-inches below this "flight-plane"—cf. below the leading portion of the middle rail $A_2$ (see FIG. 4'), preferably just aft of the associated ramp portion $r_2$.

Workers will recognize that so attaching a boss means "protuberance" relatively centrally off the forward portion of the slider will provide a "bias pitch" when the slider is at rest [on the stationary disc]—and of course will drastically reduce the contact area between slider and disc. [The slider faces are very, very smooth and flat—as is the disk surface and lube film thereon—and it is this interfacial contact of smooth flat surfaces that gives rise to "stiction"]. So providing a protuberance will, in turn, reduce (and can all but eliminate) the potential "stiction" force due to extreme flat conditions of the interface (note that slider SL-I now rests only on the boss and its trailing edge TE, rather than on the entire lengths of its slider rail faces).

Figure 4:
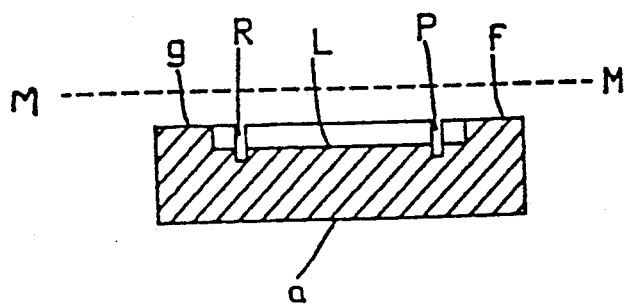

The boss B will preferably protrude only-barely beyond the slider level (e.g., a few micro-inches— preferably about 6u"—below flight plane f—f in FIG. 4'); for instance, just enough to induce a fast efficient lift-off when the disc is suddenly rotated, yet not enough to interfere with air flow along the slider rails while they fly just above the disc. A protrusion of 5–10 micro-inches is found quite satisfactory under the subject conditions as noted below in more detail [slider assuming to be flying about 24–35 micro-inches above the disc, which we assume was covered with a lube thickness of about 20–60 Å. Here assume about 250 Å=1 micro-inch]. A 6 micro-inch protrusion distance was settled-upon as a compromise between optimum head flying attitude (cf "bias") and a stable rest configuration. And with excessive protrusion, the boss might tend to shear-off on contacting the disc, whereas too little protrusion (e.g., 2 micro-inches or less) might not adequately relieve stiction or afford other advantages, such as "fast take off" (see below).

It seems preferable to-deposit such a miniscule metallic boss. Sputtering (e.g., SiC) is recommended here as a reliable, convenient way to deposit a boss B with a protrusion of a few micro-inches (a micro-deposition). Particularly good results and a simple method have been realized by sputtering the subject boss B (FIGS. 1'-4') on the mid-rail of slider SL-I just before mounting the slider on its support flexure. To do this, one may readily mask-off all slider surfaces except at the boss site [as is well known in the art; photo resist might be used, as workers know]. Then, one can sputter the requisite "boss material" (6 micro-inch) thickness relatively uniformly.

One preferred "boss material" with such a conventional slider [i.e., a slider made of $Al_2O_3$ TIC material] is silicon carbide (SiC). However, workers will realize that other such (hard) boss materials compatible with good adhesion to such a slider might comprise titanium carbide (TiC), $Al_2O_3$ or the like. [To make the boss of "slider material", or its mechanical equivalent, itself would, of course, be highly desirable, if such is convenient; e.g., this should yield optimal bonding, matching-thermal expansivity, etc.].

Somewhat surprisingly, alumina ($Al_2O_3$) is a relatively non-preferred boss material since it is found relatively too soft when deposited in the amorphous state [e.g., surviving for only 4-5K cycles in a stop-start test]. And, while it is presumably quite a bit harder in the crystalline state, the heating necessary to induce crystallinity (in situ) is believed potentially harmful to the transducer on the slider.

It appears preferable to deposit "boss material" that is somewhat of a match in stoichiometry with the substrate slider material; else adhesion, etc. may be inadequate. For instance, for a slider like SL-I, we found that a pure tungsten slug adhered very poorly to the [ceramo-metallic] slider; apparently no "pure metal" would give good adhesion in such a case.

In any event, workers will appreciate that the "boss material" selected for deposition (or otherwise attached) will give sufficiently strong adhesion and hardness and other mechanical characteristics so as to remain in place and not significantly wear away during a full useful operating life [e.g., enduring at least 10K stop-start cycles, or a like durability test]. The boss, as mentioned, will protrude below the slider profile only sufficient to substantially relieve "stiction" and related problems, and very little more, lest its protruding profile disturb flight aerodynamics as it over-flies the disc [however, see below for the piezoelectric alternative which may be "withdrawn" during flight time, etc.].

RESULTS

The foregoing embodiment [FIGS. 1'-4'] was observed to give several surprising, highly desirable results.

More particularly, the so-improved slider [with protruding boss] was subjected to "stop-start" tests giving surprising indications of superior survivability (durability). (See data in FIG. 3'). A "stop-start test" involves placing a slider in operating relation with a magnetic recording disc and stopping and starting the disc repeatedly to cause the slider to "take off" and "land" under conditions simulating actual use. The "survivability" of a slider-disc combination is adjudged. according to the number of such stop-start cycles that can be run before significant degradation occurs, especially a "crash" or other catastrophic failure.

The subject embodiment [with the sputtered boss medially of the slider rails] has been run through a stop-start test on a normally lubricated disc [55 Å average applied depth of lube] in a high speed computer disc drive environment [Memorex 3680 disc drive]. Quite surprisingly, the protruding "boss" neither wore away nor did any perceptible damage to the disc surface over 10,000 cycles and beyond [and did not crash, as a conventional slider would likely have], while also evidencing a relatively lower "particle count" than with a "standard, non-bossed 3680 slider".

Such results are summarized in FIG. 13' [note above that the slider here took off and landed approximately 240 times per hour; that it was run concentrically around a single disc track; and that 10,000 start-stop cycles corresponds to approximately 10 years of "normal operating use". A normal 3680 slider would have lasted for about 3,000 cycles, and then crashed under these conditions].

This stop-start test (summarized in FIG. 13') is instructive. Note that during the first six to twelve hours a relatively high particle count [using a commercial grade particle counter—of 0.3-0.5 micron] was experienced—(cf. FIG. 13', e.g., peak at about 4 hours). This is rather normal and is believed to result from a "burnishing" of the peaks and asperities on the disc by the slider as it skids over the disc surface during take off and landing.

By way of illustration, one might also note that if a "crash" were imminent during such tests, it would typically be preceded, and "flagged", by an enormous rise in particle count [e.g., an "explosion" of two to three times the running count in just a few seconds; then a few minutes later, a "groove" would appear, worn into the disc's test track (e.g., three to four minutes in usual case)—this quickly followed by a catastrophic "crash" [due, principally, to pick-up of disc material by the slider]. Dotted-curve 13-A in FIG. 13' is intended to represent such an "exploded" count and imminent crash.

Also, during this such a test, it was noted, quite unexpectedly, that a so-improved slider [with center boss protruding] appeared to "lift-off" relatively more quickly than normal. For instance, where a "standard unbossed 3680 slider" will lift-off and begin to fly when disc velocity reaches about 300 inches per second, the subject "bossed" embodiment lifted off at about 250 inches per second. This is possibly due to the favorable "pre-bias", or tilt, created by the upstanding boss. Workers in the art will appreciate how valuable such an "early lift-off" is. This early lift-off is also believed responsible (at least partly) for the marked decrease in initial particle count often observed with the invention (e.g., see FIG.14', discussed below). This early lift-off will also be desirable to more quickly bring the slider into a smooth, laminar-flow flight mode, reducing turbulence and noise during lift-off and generally affording better air bearing performance [allowing one to shorten the take off zones and thus increase available bit space on the disc and increase disc life]. At any rate, workers will highly value a slider allowing earlier lift-off (at lower disc rpm).

This embodiment was also surprisingly superior under "low lube" ("thin lube") conditions, e.g., surviving 10,000 start-stops on a "depleted" lube thickness [about 20 Å applied], while generating relatively less than the normal number of "particles" ("macro-particles" about a certain size; see FIG. 15' discussed below). Workers will appreciate how surprising such results are; e.g., where a normal slider is useless under such "depleted lube" conditions since it will typically crash at less than about 1,000 stop-start cycles, a mere "bossing" of the slider can give a normal operating life (10K+ cycles).

Workers will appreciate how very significant such a "thin lube capability" is; and indeed how surprising it is that a slider with a protruding boss would need less lubrication—not more! Conventional thinking would have supposed that the boss would be more likely to dig-into the disc, even with "normal" lube thicknesses—indeed we examined the disc during start-stop testing, half-expecting to see a "groove" appear—yet none did! This was confirmed in a "Park Test", subjecting a "bossed-slider" to a normal 15 gm load as "parked" at rest on a normal 3680 disc for 48 hours or more. No change or special perceptible damage to the disc was apparent [that is, the disc was in no different condition than with a normal slider].

This embodiment was also tested on an abnormally heavily lubricated disc [300–1,000 Å, well above the usual lube thickness]; and for a considerable and surprising number of cycles (5,000) the bossed slider didn't appear to stick to the disc at all. This is in marked contrast to the performance of a "standard 3680 slider" which, under such heavy lube, shows visible stiction at once, accompanied by a "pinging" noise as the slider-support structure gets released from the disc.

Surprisingly, the only adverse effect of using such boss means seems to be that a bit of "debris" can be generated—evidently by boss-disc contact during rest times—but the amount and particle size are not significant.

Workers can appreciate the foregoing results are quite unexpected and a great surprise, really—especially since workers expected that (or wondered if) the protruding boss would dig into and damage the delicate disc surface (e.g., more than the smooth slider rails normally do). It was apparent that it did not—on the contrary, the "bossed" slider evidently does less damage, not more, to a disc surface.

In sum, workers will appreciate how surprising such results are using a boss-modified slider; how surprising that it performs better (longer) than a normal slider, whether on a normally-lubricated disc, on a lightly-lubricated disc, or on a heavily-lubricated disc [e.g., earlier lift-off], and how surprising that it lasts enormously longer than a normal slider in "thin lube" conditions. Workers will especially appreciate the prospects for using such "bossed sliders" under "low lube" (or even "no lube") conditions, especially where flying heights are abnormally low (e.g., below about 10 micro-inches).

Workers will note that the foregoing not only teaches one how to manufacture an improved slider, but also how to "retrofit" existing sliders [as do other embodiments below]. Workers will recognize that such a "boss means" can readily be affixed on a conventional three-rail slider [two-rail sliders would be similar]. Or, the sliders may be manufactured exactly as presently, except that the manufacturer, or a third party, may simply add-on the desired boss means in the indicated manner. This is, of course, an option that makes the invention very practical since one needn't radically upset the normal manufacturing mode, or radically change the vendor specs. of such sliders. Of course, the invention is also easy to incorporate into a slider manufacturing process.

Figure 1:
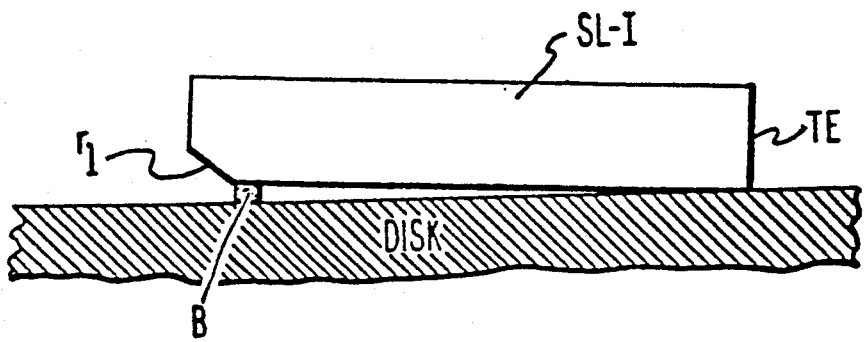
Figure 1A:
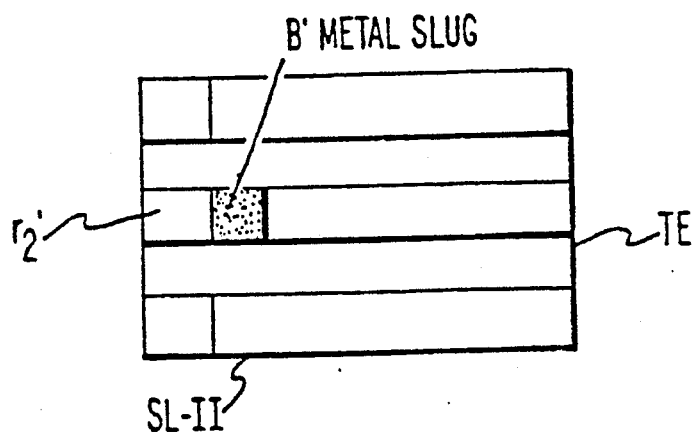
FIGS. 1B, 1C' are respective plan and side views of a related embodiment.
Figure 1B:
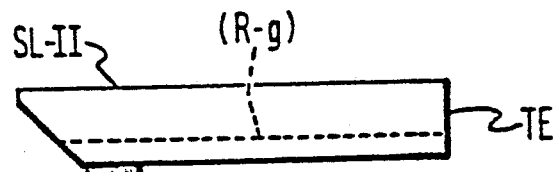

FIGS. 1A′, 1B′ show a slider SL-II, replicating the slider of FIGS. 1′–4′ [e.g., with the same or like slider] with a similar boss B′ deposited along the middle slider rail A′₂ just aft of its associated ramp r₂′, except that, after completion, the middle rail A₃′ is etched-away somewhat (as indicated along plane R-g in FIG. 1B′) to essentially remove it as an air bearing surface. One might wonder what, if any, effect this has on slider performance (e.g., aerodynamics, etc.). Happily (and somewhat unexpectedly) we have found that there are no adverse effects at all.

In particular, slider performance during stop-start testing is superior (like that of the embodiment of FIGS. 1′–4′). For example, we tested this bossed slider design SL-II in start-stop tests like those mentioned. One such is summarized in the plot of FIG. 14′ [conditions and presumptions the same as those mentioned for FIG. 13′ above, etc.] with the so-improved slider being run over a normally lubricated [55 Å average depth] disc of the type used in Memorex 3680 disc drives.

Here, it will be seen that about 42 hours of stop-start testing was quite successfully survived [no crash, etc.], with an unusually-low particle count being experienced throughout this period. [Note: A "low" particle count generally corresponds to less contact at the slider-disc interface]. From this, one might infer that one may cut-away, or otherwise eliminate, the center rail on a three-rail slider [although one need not do so!] and mount a protruding "boss means" thereon, according to the invention, and still derive the same sort of superior, surprising improvements as found with the preceding embodiment (cf. FIGS. 1′–4′).

A like stop-start test was also performed on this "second embodiment" under "depleted lube" conditions [about 20 Å average lube depth]—with comparably-long, successful results [about 36 hours without crash, etc.]. This test is represented in FIG. 15′ [otherwise derived the same as FIG. 14′]. Of course, the "absolute" particle count here (FIG. 15′) is considerably higher, as might be expected from the reduction in lube thickness and increased friction. However, this is still acceptable (is "clean enough") and should not lead to "crash" or other failure.

Slider SL-III in FIG. 5′ represents another embodiment; essentially the same as SL-I in FIGS. 1′–4′, except that three bosses, rather than one, are applied [each on a respective rail, just aft of a respective slider ramp, as with boss B SL-I] all being identical in size and construction of course. This embodiment will perform essentially like SL-I except that, with the added boss means at the front, a "higher pitch" slider results—something that is desired in certain instances.

The embodiment of FIG. 5′ (SL-III) is essentially replicated for a two-rail slider SL-IV as seen in FIG. 6′, with each (identical) boss protruding about 6 micro-inches (beyond "flight-plane") and being deposited on a respective rail (each rail about 0.0167 inch wide), just aft of its respective ramp as before.

Here, the results were essentially as in the first embodiment SL-I.

In a two-rail slider (e.g., like that of FIG. 6′) SL-V, a single elongate boss means, or slug B-V, is here deposited midway between the rails and just aft of the ramp zone. This slug B-V is thus deposited on the medial ("throat") surface $B_s$ between the rails, preferably being deposited in the fashion of those in the foregoing embodiments.

Here, the results were generally as with the embodiment of FIGS. 1′–4′.

The two-rail embodiment of FIG. 6′ is replicated in FIG. 12′ as modified slider SL-VI, except that, here, instead of the (2) bosses being deposited, they are "cold worked", or shaped during lapping, into an appropriate "boss site" portion of the slider rails, as workers in the art will understand. For instance, well-known techniques are feasible here—e.g., as a "roughening process", understood as raising "bumps" (micro-roughening) on the order of about 6 micro-inches above the normal slider surface.

For instance, one may readily gouge-up protrusions on the order of 50 Å above such a (slider) surface, as workers know. Such protrusions can be surprisingly effective as "multiple boss means", and appear to present no adverse side-effects (even during the brief contact with the disc during landing).

Here, the results achieved will be the same as for FIG. 6'.

Figure 9:
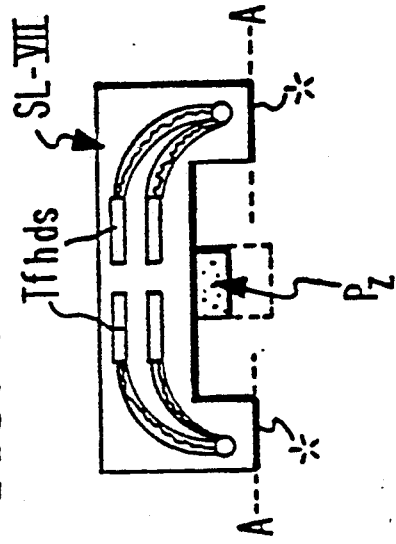
FIGS. 9'-11' are respective end, plan, and side views of a related piezo-boss embodiment.
Figure 11:
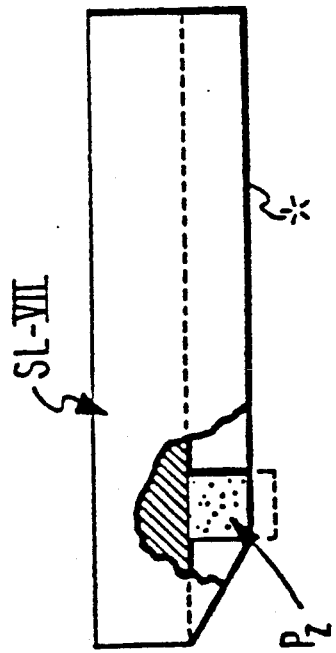

In FIGS. 9'-11', another alternate embodiment SL-VII is produced by essentially replicating embodiment SL-V of FIGS. 7' and 8', but replacing slug B-V with a "piezo-slug" $P_Z$ of relatively foreshortened height, i.e., $P_Z$ is just tall enough, or almost so, to intercept the "flight-plane" A—A of the slider rail faces (air bearing surfaces ABS—like plane f—f of FIG. 4'), yet not quite enough to project therebeyond—being about 0-6 micro-inches. However, once energized as understood by workers (means understood, but not shown or specified here), element $P_Z$ will "self-elongate" enough to intercept and cross the flight-plane A—A (e.g., extend 6 micro-inches or so beyond A—A; see dotted line representation of the elongation of $P_Z$ in FIGS. 9' and 11'). Thus, boss $P_Z$ will be selectively thrust out to protrude like the preceding boss means, and to yield the same "protruding boss" effects during a selected "boss mode" (as with the prior embodiments, but doing so only selectively, and only when energized, as known by those skilled in the art—i.e., functioning as a "selectively-protruded boss means").

More particularly, this technique will entail embedding a small piezo-element $P_Z$ at the center of the slider, between the two co-planar air bearing surfaces [rail faces ABS] and providing selective energizing piezo-power therefor. Thus, under "Rest" (no-power) conditions, the ABS and the piezo-surface will be in roughly the same plane [possibly have been lapped together; or the piezo may be slightly "foreshortened", as mentioned above].

But, in the "energized" state, the piezo-element will elongate to protrude (a few micro-inches) beyond the ABS plane A—A. This will also introduce a "bias pitch", as before; preferably on the order of a few hundred micro-radians. Therefore, only a very small portion of the integral slider body (trailing-edge plus $P_Z$) will be in contact with the disc at "Rest", or when sliding contact is made during landing or take off.

As with the "fixed (non-piezo) protruding boss means" embodiments previously discussed, this protruding piezo-boss may be expected to radically reduce slider-disc contact as to alleviate, if not entirely eliminate, problematic stiction forces acting between the ABS surfaces and the disc lubricant. Just before the start of disc rotation, energizing power to the piezo element $P_Z$ may be turned-off, contracting the piezo-element to its non-protruding length.

A "bias pitch" of various selectable degrees can be provided when the disc is stationary merely by appropriately energizing the piezo-boss ("piezo-slug") to induce a desired associated elongation. And, the element may be energized before the disc comes to rest (that is, during landing) so that there will be sliding contact only between $P_Z$ and the slider's trailing edge. Then, if the piezo $P_Z$ is elongated before the disc stops, it can help reduce excess contact force (evidently increased hydrodynamic pressure under the piezo-boss "cushions" of the slider).

Such incorporation of a "piezo-boss" element, appropriately energized and located, is a simple technique to implement. The piezo element, being a tiny capacitance device, will consume negligible power (e.g., the voltage necessary for such operation should be in the range of 20-35 volts for an elongation of the order of a few micro-inches).

RESULTS

This embodiment, in principle, yields results like the embodiment of FIG. 7', with the added advantage that debris-generation is much less likely.

Workers who prize such advantages may deem it worth the extra expense and trouble to use the piezo form of the invention.

In a different, but related, embodiment, one may use a boss like B in SL-I or the like and provide heating means to heat the boss enough to elongate it as required [as with the piezo-boss] from a condition of coincidence with the slider plane to about 5-10 micro-inches therebeyond [e.g., one can do this with an embedded coil and selectively applying current]. Whatever boss pattern (type) is used, it may usually be located anywhere on the slider face, unless a "forward pitch" is desired.

Workers may also contemplate alternative ways of depositing such a boss such as by plating, or vapor depositing and etching - back, or vacuum deposition, flame coating, ion-gun deposition (local) oxidation, etc., as known in the art.

Now, workers might, at first blush, think that a plastic boss would be preferable, e.g., a teflon (tetrafluoroethylene) boss that has a relatively low coefficient of friction. Surprisingly, this doesn't appear to be necessary or important—although one might deposit a plastic (like teflon) by providing a suitable "adhesion-site" [e.g., epoxy bond a teflon substrate in place of the above bosses and thereafter cold working, or depositing a super-layer of teflon thereon—e.g., by vacuum evaporating teflon stock so it deposits preferentially onto this "teflon substrate"]. As some workers may know, it is, unfortunately, not possible to lap, or otherwise precisely machine, plastic to within a few micro-inches as required for the subject invention.

In summary, it is preferred that one, or more, fixed or extendable boss means (micro-protuberances) be provided, front and center of a slider, or else symmetrically about the forward slider end, to function as anti-stiction means, bias means and the like.

"boss" combined with "back-bar"; most preferred

We have found that one may advantageously add "back-bar means" to sliders equipped with such "boss means", with little or no perceptible trade-off. The following most preferred Example A illustrates this.

Figure 24A:
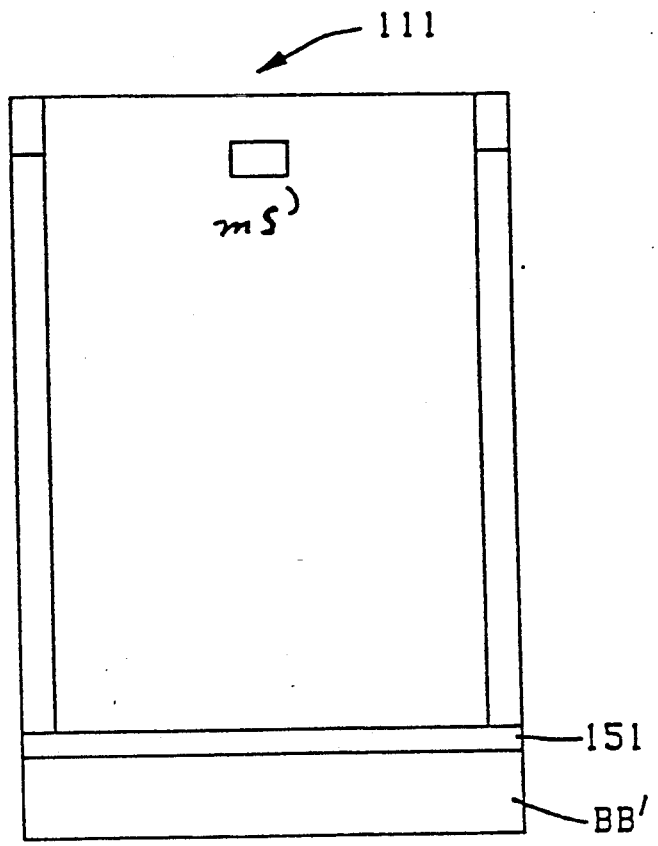
FIGS. 24A, 24B are plan and side views of a slider (e.g., per FIG. 9A) with both a back bar and a boss.
Figure 24B:
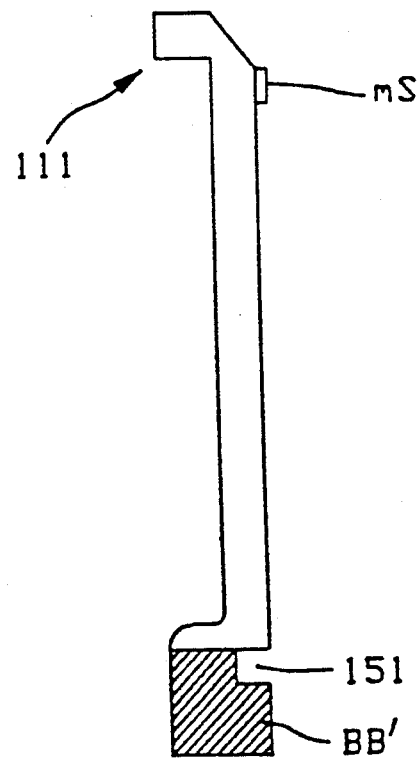

Ex. A: Slider with boss and back-bar (FIGS. 24A, 24B):

Slider 111 in FIGS. 24A, 24B (after FIGS. 19A, 19B, with boss ms added, e.g., as per FIG. 1A', etc.) will be understood as a "self-loading" slider provided with back bar means (cf. back-bar BB; and associated purge channel 151) and in every respect like the slider of FIGS. 19A, 19B, except that a medial boss means "ms" is also provided on the flying surface thereof (centrally, just aft of ramps, e.g., as in FIG. 1A', etc.).

Workers will find that such a boss ms (or equivalent boss means) will provide the usual "boss advantages", noted above (e.g., relieve "stiction"), yet without interfering perceptibly with "back-bar" operation (e.g., as noted above) or with other slider characteristics (e.g., slider 111 can still be "self-loaded" and "self-unloaded" as known in the art).

Moreover, there are special advantages to using "boss means" with a back-bar equipped slider. For instance, when such a slider is operated on a "lubed" disc surface, the miniscule back-bar cavity (e.g., only 150 u" deep or so, and other such micro-cavities, e.g., as in a self-loading slider) is all too apt to take up, and secrete, impurities such as lube fluid, atmospheric smoke and other gases which can increase "stiction". Thus, anti-stiction boss means is all the more called for.

Also, a boss is co-advantageous with back-bar means; both accommodate fine-polishing, etc. of the slider's flying surface without concern over damaging it, or damaging the slider's "tail" or delicate means thereon (e.g., a fine $Al_2O_3$ film there, or end-mounted transducers or like "chips")—e.g., especially because the "tail", etc. is isolated from the rest of the flying surface by its channel or "moat" (e.g., see channel 151 in FIGS. 24A, 24B), and because a boss can be "raised" late in the manufacturing stages (e.g., by cold-working or micro-roughening the surface as for the embodiment of FIG. 12'). Both the back-bar and the boss can better accommodate otherwise problematic finishing operations, such as heat-polishing (e.g., with a laser). And a back-bar equipped slider is apt to be particularly susceptible to stiction (e.g., where slider-disc contact area reduced; where slider's contact surface is particularly smooth and/or lube-filled)—and thus is an especially apt subject for our anti-stiction boss means.

And, surprisingly, workers will find that most such "back-bar-equipped" sliders are still relatively insensitive (less sensitive), during operation, to changes in loading force and/or disc speed (rpm); while still accommodating automatic low-speed unloading (for "self-unloading" sliders).

It will also be somewhat surprising that, even where a boss is used, the slider's aerodynamic characteristics are kept intact and back-bar properties unimpaired. For instance, the back-bar means (e.g., as in FIGS. 24A, 24B) can still be used to fine-burnish a disc surface, polishing-down micro-asperities thereon. Such may be done during a "test run" of the "slider-with-back-bar" over the disc recording surface, preferably at relatively high speed (note a back-bar accommodates particularly small flying-heights). This can allow workers to dispense with the special "burnishing head" commonly used for this purpose, saving the special fabrication steps associated therewith.

Figure 25A:
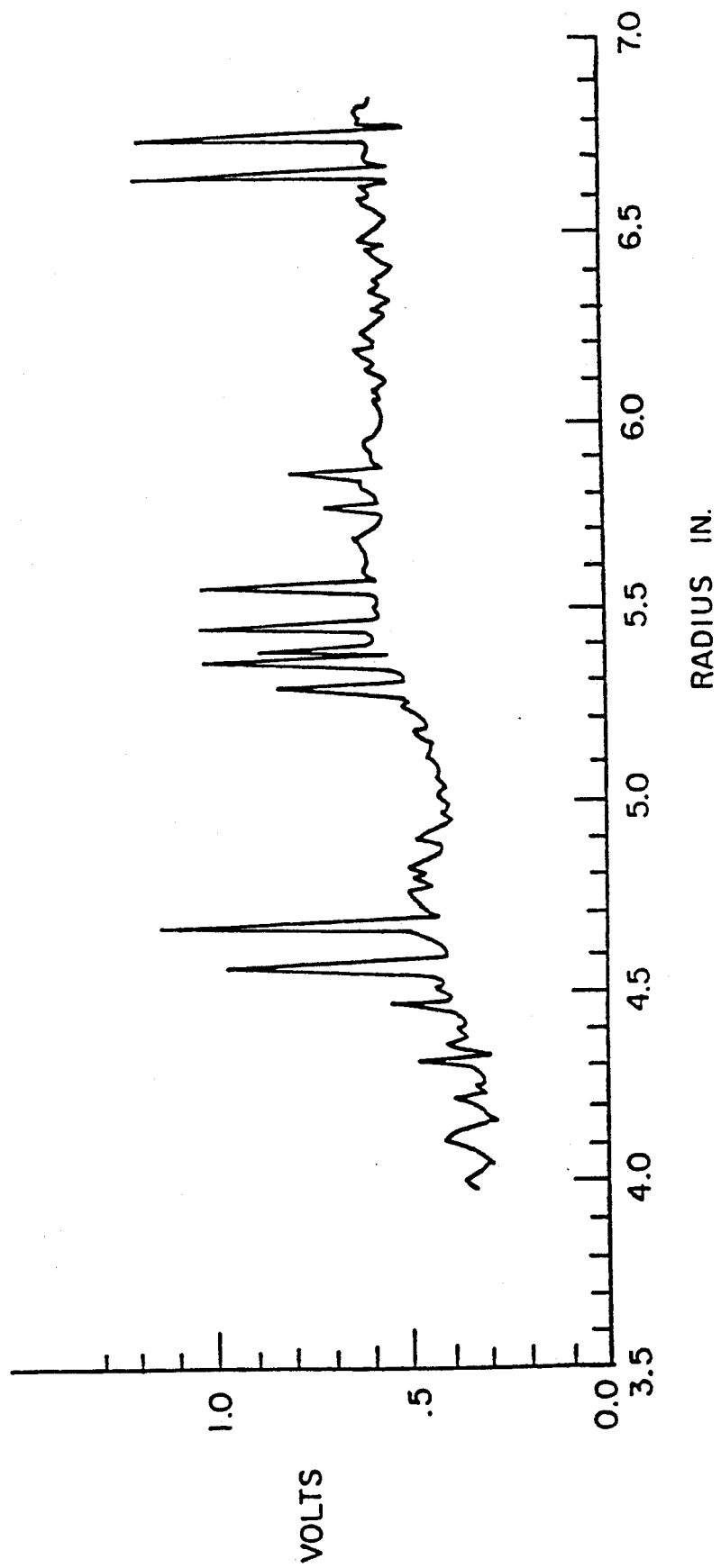
Figure 25B:
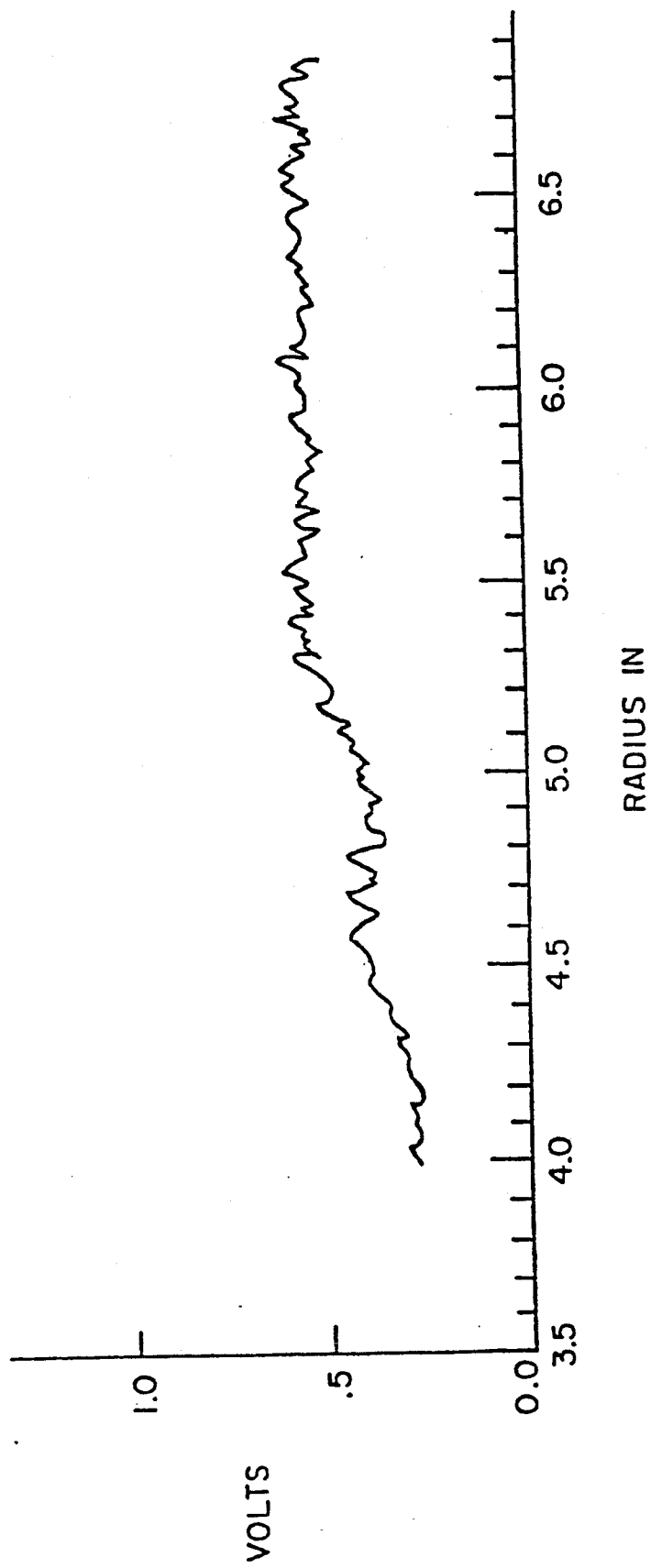
FIG. 25B is the same plot after "burnishing" this disk surface with a "back-bar-furnished" slider.

Some effects of such "burnishing" are illustrated (plotted) in FIGS. 25A, 25B. In FIG. 25A a given disk recording area (cf. radius 4.0"-6.9") will be understood as exhibiting an unburnished surface roughness as per the indicated plot [cf. RMS voltage output of acoustic emission sensor with disk rotated at 1800 rpm; voltage spikes corresponding to major asperities]. The same disk surface, after burnishing with such a back bar-equipped-slider, is indicated in FIG. 25B, tested the same way [note all major asperities removed by such burnishing, and many minor ones].

Variations:

And workers will recognize that a slider equipped with any such back-bar means can be advantageously provided with other boss means to yield like results.

It will be understood that the preferred embodiments described herein are only exemplary, and that the invention is capable of many modifications and variations in construction, arrangement and use without departing from the spirit of the invention.

Workers will appreciate that such back-bar/purge channel features are most apt for use with negative pressure-type sliders which fly at less than 10 u". Workers will also appreciate that, in appropriate instances, one may alternatively use such design back-bar/purge channel with low flying, positive pressure (Winchester) sliders.

Further modifications of the invention are also possible. For example, the means and methods disclosed herein are also applicable to other disc memory systems (e.g., plated media, floppy discs) as well as to flexible media in general. Also, the present invention is applicable for providing such purging, etc., with other forms of low-mass recording and/or reproducing systems, such as those in which data is recorded and reproduced optically. Also, the present invention is applicable for providing "-anti-stiction" boss means (or boss-bias means) to reduce related forces between any such smooth surfaces, especially to reduce relative friction therebetween, whether the surfaces are lubricated or not.

The above examples of possible variations of the present invention are merely illustrative. Accordingly, the present invention is to be considered as including all possible modifications and variations coming within the scope of the invention as defined by the appended claims.

What is claimed is:

1. A method of adapting a magnetic recording slider having a prescribed shallow "flying cavity" on its media-confronting face to exhibit "self-purging", better stability and increased stiffness, and to resist "stiction", this method including: providing back bar means disposed across the cavity on the trailing face of the slider, while adapting this back bar means to include purge channel means disposed in fluid communication between the cavity and the ambient atmosphere whereby to better purge the cavity of gas and associated contaminants; and also providing "boss means" on the forward portion of this face, such as to pitch-up this face, at least sufficient to relieve stiction, wherein the boss means comprises one or more micro-protuberances projecting a prescribed micro-dimension below the flying-surface of this face, but insufficient to interfere with slider flight.

2. The method as recited in claim 1, wherein the boss means is also adapted to accommodate reduced flying height.

3. The method as recited in claim 1, wherein the boss means is also adapted to accommodate reduced lube thickness along with extended operating life.

4. The method as recited in claim 1, wherein the boss means is adapted to accommodate shorter take-off distances and faster lift-off.

5. The method as recited in claim 1, wherein the cavity functions as a "negative pressure passage" and said urge channel means is arranged and constructed to communicate with the exit end of this "passage" and quickly empty it and purge it of debris.

6. The method as recited in claim 5, wherein the purge channel is formed to comprise a groove cut into the trailing portion of the flying face of the slider and extends transverse the flying direction.

7. The method as recited in claim 5, wherein the cavity is the order of one to a few hundred u" deep and several dozen mils wide and the purge channel is formed to be considerably larger, up to a few mils deep; and the boss means projects a few micro-inches or less.

8. The method as recited in claim 7, wherein the slider is the "self-loading type" adapted to fly at a minimum height of one to several u", the back bar means being thus constructed and arranged to render the slider more stable despite moderate changes in loading; and the boss is also adapted to produce a slider that generates fewer "macro-particles" and gives a lower "particle count".

9. The combination as recited in claim 1, wherein the boss means is also adapted to give a prescribed "bias pitch" to the slider, while also avoiding "yaw" of the slider face relative to the media surfaces.

10. The combination as recited in claim 1, wherein the boss material comprises "slider material" or the mechanical equivalent thereof, at least on the exposed face thereof.

11. The combination as recited in claim 10, wherein the slider face is comprised of a carbide of silicon or titanium, or of alumina, and the face of the boss means comprises a carbide of silicon or titanium.

12. The combination as recited in claim 1, wherein the boss means is arranged to project only very slightly beyond the flight-surface of the slider means, just enough to counteract stiction forces, yet insufficient to upset flight characteristics.

13. The combination as recited in claim 1, wherein the boss projection is the order of a few micro-inches or less.

14. The combination as recited in claim 12, wherein the boss projects about 5–10 u" for a flight-height the order of 24–30 u".

15. The combination as recited in claim 1, wherein the boss means are retrofitted on a complete, existing pre-manufactured slider.

16. The combination as recited in claim 1, wherein the boss means comprises a piezo-electric slug disposed medially on the forward portion of the slider face and just tall enough, or almost so, to intercept the slider "flight plane" defined by associated slider rail faces; and is also arranged to be selectively activateable at prescribed "projection-times" to be sufficiently elongated to cross this "flight plane" and extend therebeyond.

17. The combination as recited in claim 16, wherein associated piezo-power means is arranged to automatically so activate the piezo-slug at said "projection-times".

18. The combination as recited in claim 17, wherein the piezo-slug is adapted to extend up to a few micro-inches beyond the "flight plane".

19. The combination as recited in claim 17, wherein the piezo-slug is to activated and so elongated during periods of "high stiction".

20. The combination as recited in claim 19, wherein the piezo-slug is so activated and so elongated when the slider is "landing" or "taking-off" or "at rest" on an associated disk.

21. The combination as recited in claim 16, wherein the piezo-slug is so activateable to also be projected from the slider face sufficient to give the slider means a prescribed "pitch bias" when at rest on an associated disk surface.

22. A method of providing magnetic recording slider means including the steps of:
providing a prescribed anti-stiction boss means on a forward portion of the record-confronting face thereof, and
providing back-bar means along the railing edge of this face.

23. The method as recited in claim 22, wherein the boas means is arranged and adapted to be selectively projected beyond this face during "stiction"-prone periods.

24. The combination as recited in claim 23, wherein the boss means comprises a slug means adapted to be selectively energized sufficient to elongate and be projected a prescribed protruding distance beyond the flight plane of the slider means; and wherein activation means is also arranged to so elongate the slug means automatically at prescribed projection times.

25. Improved magnetic recording slider means having prescribed anti-stiction boss means on a forward portion of the record-confronting face thereof, plus back bar means along the trailing edge of this face.

26. The combination as recited in claim 25, wherein the slider has a prescribed shallow "flying cavity" on its media-confronting face projecting a prescribed micro-dimension beyond the flying-surface of the face, insufficient to interfere with slider flight; and wherein this back bar means includes purge channel means disposed in fluid communication between the cavity and the ambient atmosphere whereby to better purge the cavity of gas and associated contaminants.

27. The combination as recited in claim 26, wherein the boss means is also adapted to accommodate reduced flying height.

28. The combination as recited in claim 26, wherein the boss means is also adapted to accommodate reduced lube thickness along with extended operating life.

29. The combination as recited in claim 28, wherein the boss is also adapted to produce a slider that generates fewer "macro-particles" and gives a lower "particle count"; and wherein a plurality of R/W transducer means are mounted along the back bar means.

30. The combination as recited in claim 28, wherein the boss means is adapted to accommodate over 10,000 stop/start cycles.

31. The combination as recited in claim 26, wherein the boss means is adapted to accommodate shorter take-off distances and faster lift-off.

32. The slider as recited in claim 26, wherein a plurality of R/W transducer means are mounted along the back bar means.

33. The slider as recited in claim 32, wherein the back bar means is constructed and arranged to include a bar member extending fully across the cavity exit zone and across the slider width.

34. The slider as recited in claim 33, wherein the purge channel means is formed to comprise a prescribed shallow groove between said bar member and the exit zone of the cavity, this groove communicating with the sides of the slider and extending relatively transverse said flying direction.

35. The slider as recited in claim 34, wherein the slider is a "self-loading" type.

36. The combination as recited in claim 25, wherein the boss means is also adapted to give a prescribed "bias pitch" to the slider, while also avoiding "yaw" of the slider face relative to the media surfaces.

37. The combination as recited in claim 25, wherein the slider face exhibits two or three rail means and the boss means is disposed on the forward portion of one or several rail means and/or is disposed therebetween; wherein the slider includes a shallow flying cavity on this face and wherein the back bar means is constructed and arranged to include a bar member extending fully across the cavity exit zone and across the slider width.

38. The combination as recited in claim 37, wherein the slider face is characterized by two rail means and the boss means is disposed therebetween at the forward portion.

39. The combination as recited in claim 37, wherein the slider face is characterized by three rail means, wherein the mid-rail means is cut-back at least at its forward portion and replaced by a boss means there.

40. The combination as recited in claim 39, wherein the mid-rail means is cut-away completely and a boss means disposed o the forward portion on the site thereof.

41. The combination as recited in claim 25, wherein the boss material comprises "slider material" or the mechanical equivalent thereof, on the forward portion of the exposed face thereof.

42. The combination as recited in claim 41, wherein the slider face is comprised of a carbide of silicon or titanium, or of alumina, and the face of the boss means comprises a carbide of silicon or titanium.

43. The combination as recited in claim 25 as characterized by piezo-boss means arranged and activateable to be selectively projected only very slightly beyond the flight-surface of the slider means, just enough to counteract stiction forces, yet insufficient to upset flight characteristics.

44. The combination as recited in claim 43, wherein this projection is the order of a few micro-inches or less.

45. The combination as recited in claim 44, wherein this projection is about 5–10 u″ for a flight-height the order of 24–30 u″.

46. The combination as recited in claim 25, wherein the boss means is retrofitted on a complete, existing pre-manufacture slider, and wherein the slider includes a shallow flying cavity on its face, and wherein the back bar means is constructed and arranged to include a bar member extending fully across the cavity exit zone and across the slider width.

47. Improved magnetic recording slider means having prescribed anti-stiction boas means on a forward portion of the record-confronting face thereof adapted to be selectively projected therebeyond; plus back bar means on the trailing end thereof.

48. A method of adapting a magnetic recording slider having a prescribed shallow "flying cavity" on its media-confronting face to exhibit "self-purging", pitch-up, better stability and increased stiffness, this method including:
providing back bar means across the cavity on the trailing face of the slider, while also adapting this back bar means to include purge channel means disposed in fluid communication between the cavity and the ambient atmosphere whereby to better purge the cavity of gas and associated contaminants; while also providing boss means on the forward portion of said face, sufficient to induce enough pitch-up to alleviate stiction.

49. The method of claim 43, wherein the disk confronting slider face portions for defining a prescribed flight-plane in its moving transducing mode, with anti-stiction boss means disposed on each said disk-confronting portion face so as to project toward a subject disk, said boss means being adapted for spacing said face from a subject disk and comprising:
disposing slug means medially on forward portions, only, of at least some slider face portions, and making said slug means project sufficiently to cross this "flight plane" and barely extend therebeyond, and to thereby reduce "stiction", and pitch-up the slider means when the said slider is "landing", or is "taking-off" or is "at rest" on the associated disk.

50. The method of claim 49, wherein said slug means so projects up to twenty micro-inches beyond said flight plane.

51. Magnetic disk recording slider means for presenting transducer means, said slider means having anti-stiction boss means on one or more disk-confronting face portions thereof; said boss means being adapted for spacing said face from a subject disk and projecting toward a subject disk, and being disposed medially on leading portions of at least some disk-confronting face portions to project away therefrom, at least sufficient to give said carrier means a prescribed "pitch-up bias" when at rest on the associated disk surface; with all trailing portions free of said boss means; and cavity means along said face, being closed at its trailing portion by purge channel means.

52. The magnetic disk recording slider means of claim 51 wherein said boss means so projects twenty micro-inches or less.

53. The magnetic disk recording slider means of claim 51 wherein said face defines an air bearing surface and wherein said boss means is projected only very slightly beyond said air-bearing-surface, just enough to counteract stiction forces, yet insufficient to seriously upset flight characteristics.

54. The magnetic disk recording slider of claim 53 wherein said boss means comprises one or more like slugs projecting very slightly beyond the plane of the said air-bearing surface, sufficient to relieve stiction, yet insufficient to interfere with flight.

55. The magnetic disk recording slider means of claim 51 wherein said face includes a pair of disk-contacting rail means for affording combined contact/air-bearing surfaces; and wherein said anti-stiction boss means is disposed centrally, between said disk-contacting rail means, with face areas aft thereof being entirely smooth.

56. The magnetic disk recording slider means of claim 51 wherein said boss means has a height only just sufficient to relieve stiction.

57. Magnetic recording slider means for presenting transducer means, said slider means having at least one disk-confronting face for resting upon, and interacting with, the lubricated surface of a magnetic recording disk, said slider means including:
one or more boss means disposed only on forward portions of each said record-confronting face and projecting toward a subject magnetic recording disk sufficient to alleviate stiction and related problems; said boss means being adapted for spacing said face from a subject disk, plus cavity means along said face, being closed at its trailing portion by purge channel means and by back bar means.

58. Improved magnetic recording slider means for presenting transducer means, said slider means having a disk-confronting face defining the slider flight-plane, and having anti-stiction slug means on each said record-confronting face, said slug means being adapted for spacing said face from a subject disk and being disposed medially and only on forward portions of each said record-confronting face and having sufficient height to extend slightly beyond said "flight-plane"; plus cavity means along said face, being closed at its trailing portion by purge channel means and by back bar means.

59. The magnetic disk recording slider means of claim 58 wherein said slug means extends up to twenty micro-inches beyond the said flight plane.

60. Magnetic recording slider means for presenting transducer means, said slider means having at least one disk-confronting face better adapted to rest upon, and interact with, the lubricated surface of a magnetic recording disk, said slider means comprising:

one or more like boss means disposed only on forward portions of each said record-confronting face, and projected toward a subject magnetic recording disk, sufficient to improve the "rest" condition of each said slider face on the lubricated surface of said disk; said boss means being adapted for spacing said face from a subject disk; plus cavity means along said face, being closed at its trailing portion by purge channel means.

61. Improved magnetic recording slider means for presenting transducer means, said slider means having at least one disk-confronting face defining the slider flight-plane, and having anti-stiction slug means on each said record-confronting face, said slug means being adapted for spacing said face from a subject disk and being disposed only on forward portions of each said slider face and having a height which extends only slightly beyond said "flight plane"; plus cavity means along said face, being closed at its trailing portion by purge channel means and by back bar means.

62. The magnetic recording slider means of claim 61 wherein said slug means is so extended sufficient to relieve "high stiction" conditions.

63. The magnetic recording slider means of claim 51 wherein said slug means is so extended sufficient to improve the interaction of said disk-confronting face with the media surface when the said magnetic recording slider means is "landing" or is "taking-off or is "at rest" on an associated disk.

64. The magnetic recording slider means of claim 61 wherein said slug means is so extends up to a few microinches beyond the said flight plane.

65. Magnetic disk recording slider means for presenting transducer means, said slider means having anti-stiction boss means on a disk-confronting face defining an air bearing surface and including a pair of disk-contacting rail means thereof; said boss means being adapted to spacing said face from a subject disk and projecting toward a subject disk, only very slightly beyond said air-bearing surface, just enough to counteract stiction forces, yet insufficient to seriously upset flight characteristics; and being disposed medially on the forward portion of said disk-confronting face to project away from said face, at least sufficient to give said carrier means a prescribed "pitch bias" when at rest on the associated disk surface; said boss means thus being disposed centrally, between said disk-contacting rail means, with face areas aft thereof being entirely smooth; plus cavity means along said face, being closed at its trailing portion by purge channel means.

66. A method of stabilizing a magnetic recording slider having a prescribed single shallow "flying cavity" on its media-confronting face, this method comprising:

providing back bar means so as to terminate said cavity; and disposing associated transducer means across the trailing face of the slider;

while arranging this back bar means to include purge channel means cut into said trailing face to be in fluid communication between the cavity and the ambient atmosphere and being sufficiently large to better purge the cavity of gas and associated contaminants, and to isolate said trailing face and transducer means mounted there, from exit-flow and its associated turbulence and debris; while also providing boss means on the forward portions of said face, sufficient to alleviate stiction.

67. A method of stabilizing a magnetic recording slider having a prescribed single shallow "flying cavity" with a medial air bearing surface on its media-confronting face, this method comprising:

providing back bar means and disposing it across the trailing face of the slider to terminate said medial air bearing surface, and to thus be adapted to block air flow along said cavity, while presenting a full-width trailing edge for mounting transducer means; cutting transverse purge channel means deeply into said air bearing surface so as to be in fluid communication between the cavity and the ambient atmosphere whereby to better purge the cavity of gas and associated contaminants; this back bar means and purge channel means thus being arranged to coact in isolating said transducer means from the flow or exit-air from said cavity and from associated turbulence and debris; while also providing boss means on one or more leading portions of said air bearing surface, sufficient to relieve stiction.

* * * * *